United States Patent
Stefan et al.

(10) Patent No.: US 8,713,312 B2
(45) Date of Patent: Apr. 29, 2014

(54) METHOD AND SYSTEM FOR DETECTING DATA MODIFICATION WITHIN COMPUTING DEVICE

(75) Inventors: Rares Stefan, Montreal (CA); Blake Stanton Sutherland, Stittsville (CA)

(73) Assignee: Trend Micrio Incorporated, Tokyo (JP)

( * ) Notice: Subject to any disclaimer, the term of this patent is extended or adjusted under 35 U.S.C. 154(b) by 736 days.

(21) Appl. No.: 12/631,859

(22) Filed: Dec. 6, 2009
(Under 37 CFR 1.47)

(65) Prior Publication Data

US 2011/0022840 A1    Jan. 27, 2011

Related U.S. Application Data

(60) Provisional application No. 61/120,474, filed on Dec. 7, 2008.

(51) Int. Cl.
*H04L 9/00* (2006.01)
*G06F 7/04* (2006.01)

(52) U.S. Cl.
USPC ........... 713/167; 713/160; 713/161; 713/162; 713/163; 726/23; 726/24; 726/25; 726/26

(58) Field of Classification Search
USPC ........................................................ 713/167
See application file for complete search history.

(56) References Cited

U.S. PATENT DOCUMENTS

| | | | |
|---|---|---|---|
| 7,565,549 B2 | 7/2009 | Satterlee et al. | |
| 7,571,476 B2 | 8/2009 | Horne | |
| 7,614,084 B2 | 11/2009 | Monastyrsky et al. | |
| 7,617,535 B2 | 11/2009 | Rentzis et al. | |
| 2005/0257054 A1* | 11/2005 | Tucker et al. | 713/167 |
| 2006/0221832 A1* | 10/2006 | Muller et al. | 370/235 |

* cited by examiner

*Primary Examiner* — Longbit Chai
(74) *Attorney, Agent, or Firm* — Victoria Donnelly; IP-MEX Inc.

(57) ABSTRACT

A method and apparatus for detecting data modification in a layered operating system is disclosed. Outbound content indicators at different layers are compared to detect potential outbound data modifications. Likewise, inbound content indicators at different layers are compared to detect potential inbound data modifications. Content indicators include checksum, cryptographic hash, signature, and fingerprint indicators. Embodiments of the present invention enable detection of data modifications across an operating system's kernel and user mode spaces, prevention of modified outbound data from reaching a network, prevention of modified input data from reaching a user application, and detection of malware and faults within an operating system.

20 Claims, 18 Drawing Sheets

METHOD AND SYSTEM FOR DETECTING DATA MODIFICATION WITHIN COMPUTING DEVICE

RELATED APPLICATIONS

The present application claims benefit from the U.S. provisional application Ser. No. 61/120,474 filed in Dec. 7, 2008 for "Method and System Detecting and Preventing Data Modification Across Kernel of operating System and User Mode Spaces", the entire contents of which being incorporated herein by reference.

FIELD OF THE INVENTION

The present patent application relates to computer security and in particular to an improved method and system for detecting data modification across the operating system kernel mode space and user mode space.

BACKGROUND OF THE INVENTION

In communicating data across a network, data is packaged according to defined protocol semantics. In the case of TCP/IP protocol the data to be sent is prepared by attaching an IP header containing the source and destination IP addresses among other header information needed for routing purposes. Depending on the protocol used by a network application, additional headers, such as TCP headers, are attached to packets leaving the network. Any packet leaving or entering the networked system consists of headers and payload data. The payload data in a packet can be of zero length.

Network data leaving and entering an operating system traverses several entities prior to being delivered to a network (send operation) or received from the network. Some of these entities have the ability to modify original data. Depending on the logical positioning of the entity, partial or complete modifications can occur, in both headers and data, so that upper or lower entities may be unaware of the changes introduced.

In view of the possibility that malicious software can operate within one or more of these entities of a computing device and modify data sent to, or received from, a network as it traverses the operating system kernel and user mode spaces, it becomes beneficial to verify that the data sent to or received from a user mode application is the same as the data received by or sent to the network card.

As it relates to computer communications, data traversing the operating system kernel to and from user mode is trusted. However, because there are points in between where malware or other software can intercept and modify the data, for example, TCP/IP stenography and other methods for covertly communicating using legitimate communications as a decoy, there is a need for developing methods and systems for detecting and preventing malicious data modification across the operating system kernel and user mode spaces.

SUMMARY OF THE INVENTION

It is an object of the present invention to provide improved methods and system for detecting data modification across an operating system kernel-mode space and user-mode space, and interrupting further progress of modified data.

The embodiments of the present invention provide a method and system for detecting data modification across the operating system kernel and user mode spaces of a computing device by determining content indicators of the data at the boundaries of the kernel-mode space and user mode space and comparing respective content indicators to determine presence of potential data modifications.

Integrity tests, performed on the data at two or more points across the kernel and user mode spaces, make it possible to compare the data at separate points and determine whether a modification has taken place. Such determination would indicate whether unwanted data changes have occurred and would be a potential indicator of malware, covert communications, or faults which may be present within the operating system.

In accordance with one aspect, the present invention provides a method of examining data within a computing device to detect data modification. The computing device includes a processor and memory segregated into a kernel space and a user space. The method comprises determining content indicators of outbound data from the computing device to a network and inbound data received at the computing device from the network. A content indicator of a data record may be selected from a number of known content-indicator types such as a checksum indicator, a cryptographic hash indicator, a digital signature, and a fingerprint. In general, more than one content indicator may be used to represent a data record.

For outbound data, the method comprises determining a number N, N≥1, of primary content indicators of outbound data at the user space, where the N primary content indicators belong to a set of M indicator types, M≥N, and determining N secondary content indicators of the outbound data at the kernel space, where the N secondary content indicators belong to the set of M indicator types. Each primary content indicator is compared with a corresponding secondary content indicator of the same indicator type, i.e., a primary content indicator and a corresponding secondary content indicator have a common indicator type from among the set of M indicator types. The method ascertains absence or presence of modifications of the outbound data according to a result of the comparison.

For inbound data, the method comprises determining N primary inbound content indicators of inbound data received at the kernel space and N secondary inbound content indicators of the inbound data at the user space. The N primary inbound content indicators and N secondary content indicators belong to the set of M indicator types. Each primary inbound content indicator is compared with a corresponding secondary inbound content indicator, where a primary inbound content indicator and a corresponding secondary inbound content indicator have a common indicator type from among the set of M indicator types. The method ascertains absence or presence of modifications of the inbound data according to a result of the comparison.

Where needed, outbound data may be normalized before determining the outbound content indicators and the inbound data may be normalized before determining the inbound content indicators.

The primary and secondary outbound content indicators of the outbound data may be communicated to a data integrity module for detecting potential data modification. The data integrity module determines integrity, or otherwise, of the outbound data upon comparing each primary content indicator with a corresponding secondary content indicator. The primary inbound content indicators and secondary inbound content indicators of the inbound data may also be sent to the data integrity module for comparison and determining integrity, or otherwise, of the inbound data.

The primary outbound content indicators may be appended to the outbound data to be extracted later for determining outbound data integrity where each primary outbound content indicator is compared with a corresponding secondary outbound content indicator. Likewise, the primary inbound content indicators may be appended to the inbound data to be extracted at a check point for determining inbound data integrity where each primary inbound content indicator is correlated with a corresponding secondary inbound content indicator.

The method further comprises producing logs and alarms upon detecting modification of the outbound data or the inbound data. The outbound data may be prevented from leaving the computing device upon detecting modifications of the outbound data and the inbound data may be discarded upon detecting modifications of the inbound data.

In accordance with another aspect, the present invention provides a system for detecting data modification in a computing device. The computing device has a processor and a shared memory segmented into a kernel-space memory and a user-space memory. The system comprises a first memory device associated with the user-space memory and a second memory device associated with the kernel-space memory.

A first set of instructions, stored in the first memory device, causes the processor to determine primary outbound content indicators of an outbound data record leaving the web browser and append the primary outbound content indicators to the outbound data record. A second set of instructions, stored in the second memory device, causes the processor to: extract the primary outbound content indicators from the outbound data record; determine secondary outbound content indicators of the outbound data record as it reaches the network driver; and compare the secondary outbound content indicators with the primary outbound content indicators to determine integrity indicators of the outbound data record.

A third set of instructions, stored in the second memory device, causes the processor to determine primary inbound content indicators of an inbound data record received at the network driver and append the primary inbound content indicators to the inbound data record. A fourth set of instructions, stored in the first memory device, causes the processor to: extract the primary inbound content indicators from the inbound data record; determine secondary inbound content indicators of the inbound data record as it reaches the web browser; and compare the secondary inbound content indicators with the primary inbound content indicators to determine integrity indicators of the inbound data record.

The system further comprises additional instructions stored in the second memory device which cause the processor to prevent the outbound data record from leaving the computing device upon determining that the outbound data record has been modified. The system may also comprise instructions stored in the first memory device which cause the processor to discard the inbound data record upon determining that the inbound data record has been modified.

A primary outbound content indicator, a secondary outbound content indicator, a primary inbound content indicator, and a secondary inbound content indicator of a data record are of a same content-indicator type. The content-indicator types may include: a checksum indicator; a cryptographic hash indicator; a digital signature; and a fingerprint. Other content-indicator types may also be devised.

The system further comprises a supervision module for generating logs and alarms relevant to the outbound data record or inbound data record upon determining undesirable data modification. The supervision module may prevent transmission of an outbound data record to the network, if it is determined that the outbound data record has been modified, and discard an inbound data record if it is determined that the inbound data record has been modified.

In accordance with a further aspect, the present invention provides a system for detecting data modification in a computing device having a processor, a kernel-space memory, and a user-space memory. The system also comprises a first memory device and a second memory device.

The first memory device is associated with the user-space memory for holding a copy of an outbound data record leaving the web browser and a copy of an inbound data record arriving at the web browser. The second memory device is associated with the kernel-space memory for holding a copy of the outbound data record arriving at the network driver and a copy of an inbound data record received at the network driver.

A third memory device has stored thereon a first set of instructions for determining integrity indicators of outbound data as it traverses the user space and the kernel space to be transmitted to a network through the network driver and a second set of instructions for determining integrity indicators of inbound data received from the network as it traverses the kernel space and the user space.

In accordance with a further aspect, the present invention provides a computing device comprising: a processor, a user memory device, and a kernel memory device. The user memory device has stored thereon user-mode applications and a web browser module comprising instructions which cause the processor to retrieve information from a network and send information to a network. The kernel memory device has stored thereon a kernel of an operating system of the computing device and a network-interface module comprising instructions which cause the processor to retrieve information from a network and send information to a network.

The computing device further comprises a first memory device having stored thereon a first set of instructions and a second memory device having stored thereon a second set of instructions. The first set of instructions causes the processor to: determine a first content indicator of the outbound data; and append the first content indicator to the outbound data to produce appended outbound data. The second set of instructions causes the processor to: determine a second content indicator of the outbound data; and compare the second content indicator with the first content indicator of the appended outbound data to determine an integrity indicator of the outbound data.

The second memory device further stores a third set of instructions, which causes the processor to: determine a third content indicator of the inbound data and append the third content indicator to the inbound data to produce appended inbound data.

The first memory device further stores a fourth set of instructions which causes the processor to: determine a fourth content indicator of the inbound data received from the web browser; and compare the fourth content indicator with the third content indicator of the appended inbound data to determine an integrity indicator of the inbound data.

The second memory device may further store additional instructions which cause the processor to permit the outbound data to leave the computing device upon ascertaining integrity of the outbound data as it reaches a network driver of the computing device The first memory device may further store instructions which cause the processor to admit the inbound data record upon ascertaining integrity of the inbound data as it traverses the computing device.

The second memory device may store a fifth set of instructions which, upon determining an unfavorable integrity indicator of the outbound data record, causes the processor to generate logs and alarms relevant to the outbound data record and prevent transmission of the outbound data record to the network. The first memory device may store a sixth set of instructions which, upon determining an unfavorable integrity indicator of the inbound data record, causes the processor to generate logs and alarms relevant to the inbound data record and discard the inbound data record.

The first memory device and the second memory device may be embedded in the shared memory.

BRIEF DESCRIPTION OF THE DRAWINGS

Embodiments of the present invention will be further described with reference to the accompanying exemplary drawings, in which.

TERMINOLOGY

Kernel Space: The term "Kernel space" refers to a part of computer memory used by the computer's operating system but cannot be accessed by regular applications. Virtual memory can be used to page a part of the kernel content to disk.

Kernel-mode Space: The term refers to operations performed by software instructions stored in the kernel space.

User Space: The term "user space" refers to a part of computer memory used by regular applications.

User-mode Space: The term refers to operations performed by software instructions stored in the user space.

Network Driver: A network driver is an application for network interface cards.

Web browser: A Web browser is a software application for sending information to a network and receiving information from the network.

Data-content indicator: A data-content indicator is a concise data string which accurately identifies the content of a much larger data block. Several content indicators are known in the art; these include checksum indicators, cryptographic hash indicators, finger prints, etc.

Checksum: A checksum is a fixed-size string computed from an arbitrary data block Cryptographic hash function: A cryptographic hash function produces a bit string of fixed size for an input data block.

Digital signature: A digital signature (also referenced as a "signature") is a hash encrypted with a private key of an asymmetrical key pair.

Fingerprint: A fingerprinting algorithm maps a data block of an arbitrarily large size to a much shorter bit string called a fingerprint of the data block.

Normalization: The term generally refers to a process of data reassembly according to predefined formats.

TCP Normalization: TCP Normalization ensures that the TCP protocol is obeyed in a way that allows the client and server to maintain their connection even when payload data length is modified. The TCP Normalization engine may reside on any "intermediate device" situated between a client and a server of a TCP connection.

DETAILED DESCRIPTION OF THE EMBODIMENTS OF THE INVENTION

Figure 1:
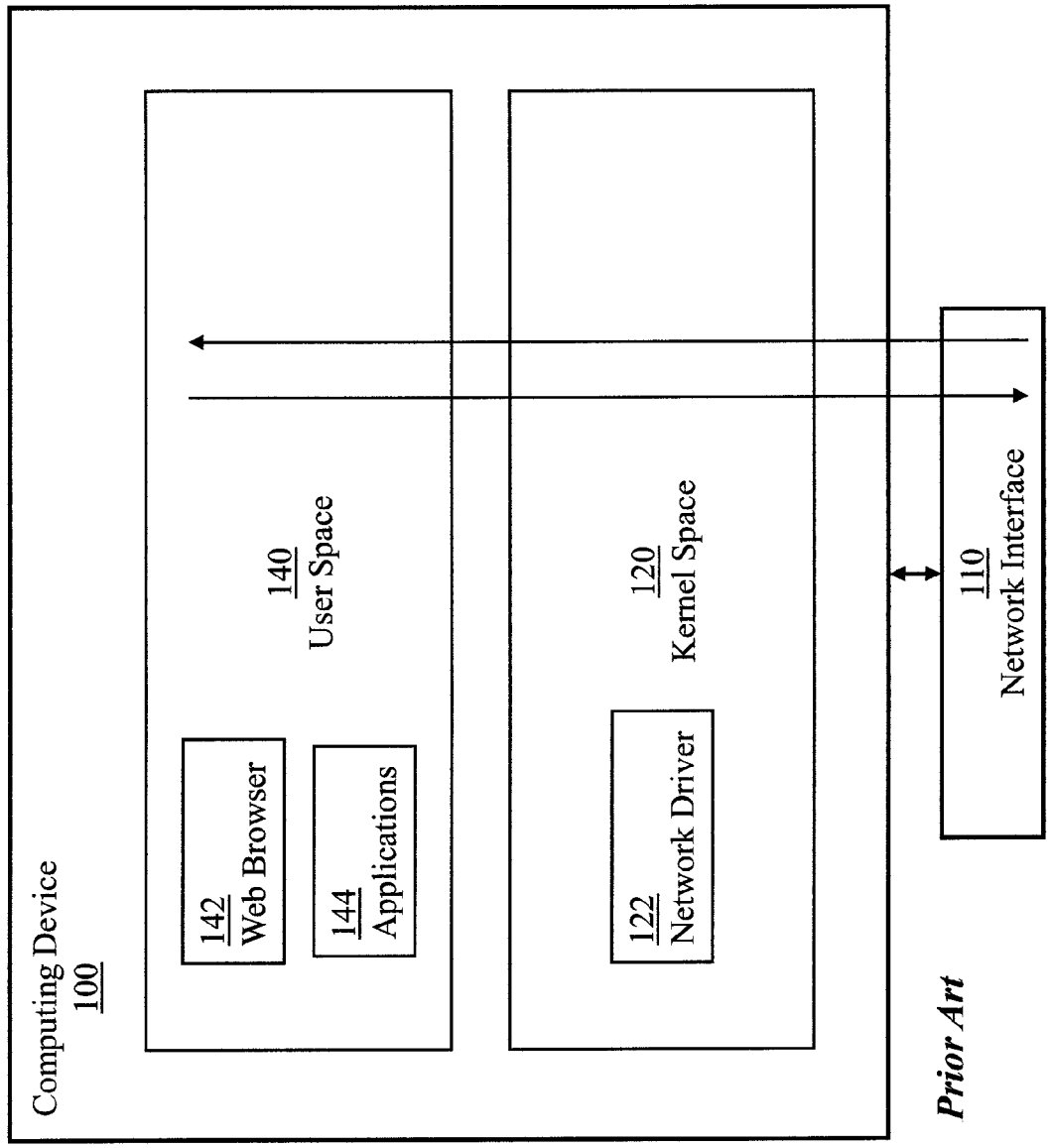
FIG. 1 illustrates data traversing a computer operating system.

FIG. 1 illustrates organization of shared memory of a computing device 100 into a kernel space 120 and a user space 140. A web browser 142, applications 144, and user-mode entities such as sockets, are associated with the user space. A network driver 122 and kernel-mode entities are associated with the kernel space. A network interface 110 handles communication between the computing device 100 and a network.

Figure 2:
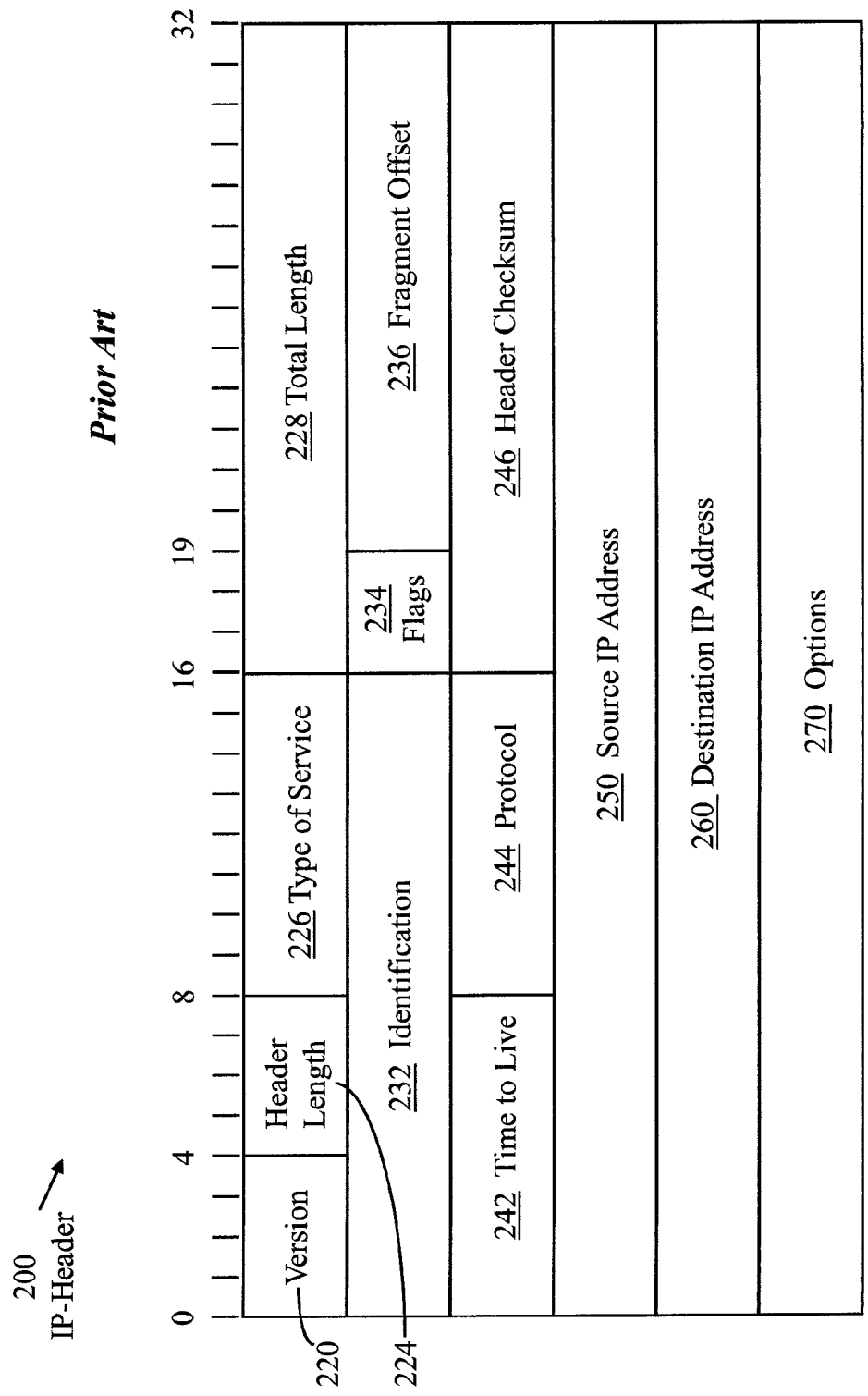
FIG. 2 illustrates data packaging into Internet-Protocol (IP) packets.

FIG. 2 illustrates an Internet Protocol (IP) header 200 specific to version 4 of the IP protocol. The IP header 200 includes several information fields, 220, 224, 226, 228, 232, 234, 236, 242, 244, 246, 250, 260, 270, familiar to those skilled in the art. The Transmission Control Protocol (TCP) may be associated with the IP protocol to provide reliable service.

Figure 3:
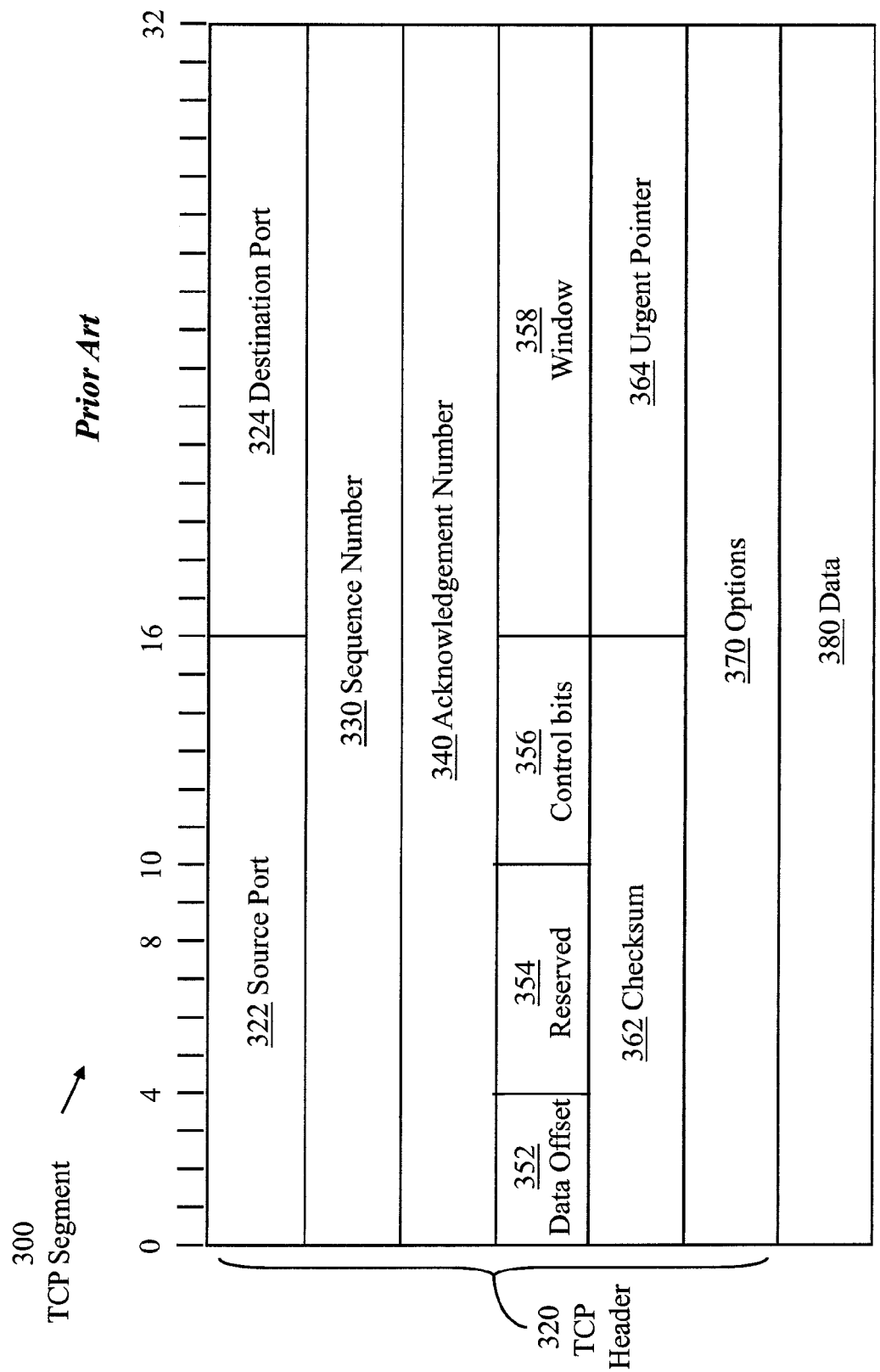
FIG. 3 illustrates a Transmission-control-protocol (TCP) segment.

A TCP segment, illustrated in FIG. 3, is a data block transferred in a TCP connection. A TCP segment 300 comprises a TCP header 320 and a TCP data portion 380. The TCP data portion 380 of the TCP segment contains data to be transmitted between the two computers. The indicated fields 322, 324, 330, 340, 352, 354, 356, 358, 362, 364, and 370 are well documented in the literature.

The sequence number (SeqNum) field 330 spans 32 bits and defines an index assigned to the first byte of payload data contained within a particular TCP segment. Each byte of data to be transmitted is numbered in sequence. The SeqNum field identifies the first byte of payload data in a TCP segment. Using the SeqNum field, a destination of a TCP connection may determine an index of a last byte of data in the segment based on size of the data block contained within the TCP segment.

The Acknowledgement number (AckNum) field 340 spans 32 bits and defines a subsequent sequence number that the sender of a TCP segment expects to receive.

The control-bits field 356 (known as the UAPRSF field) defines six different control bits or flags. These control bits govern flow control, connection establishment and termination, and the mode of data transfer in TCP. Some of the flags, such as the ACK flag and SYN flag, are used during connection establishment and some are used during connection termination.

The Window field 358 defines the size of the window, in bytes, that the sending computer maintains. Specifically, window size determines how much data a host is willing to accept and serves as a flow-control mechanism.

Figure 4:
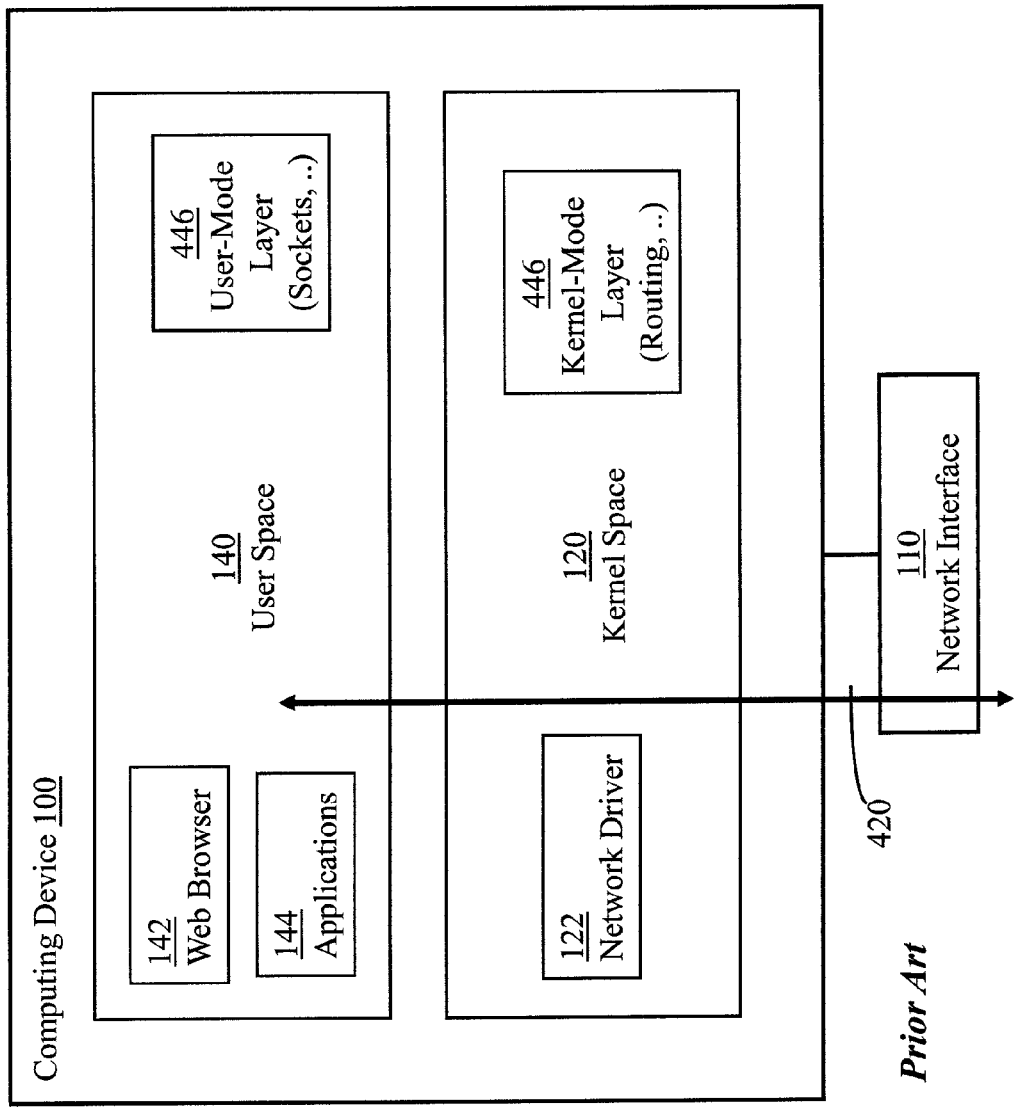
FIG. 4 illustrates entities within an operating system where data modification may occur.

FIG. 4 illustrates a generic data path 420 traversing a networked operating system acting as an end node. Information flow across the user space 140 and kernel space 120 of a layered operating system is indicated for outbound and inbound data. The web browser 142 is an example of an originating application that communicates outbound data to a network, e.g., by sending HTTP requests, and receives communications inbound from the network, e.g., by receiving HTTP responses from an external web application. Undesired data modification could occur at several points within the computing device 100.

Embodiments of the present invention may use TCP normalization capabilities described in U.S. Publication Ser. No. 11/491,233 filed on Jul. 24, 2006, and published as a US patent application publication 2007/0025374, entitled "TCP Normalization Engine", the entire contents of which being incorporated herein by reference.

A method according to the present invention provides retrieving and computing content indicators from two or more entities in a data path, by means such as Checksum (XSUM), cryptographic hashes, or signatures, and consequently comparing the results to determine if data modification has occurred and identify points (entities) preceding and succeeding occurrence of data modification.

Communication of the computed content indicators may be inserted into the communicated data itself (payload data or header/meta data) for subsequent reading and comparison at a computation point. Alternatively, the content indicators may be directly communicated between two or more integrity communication points. Content indicators may also be communicated from integrity communication points to a comparison point for determining whether data has been modified.

Figure 5:
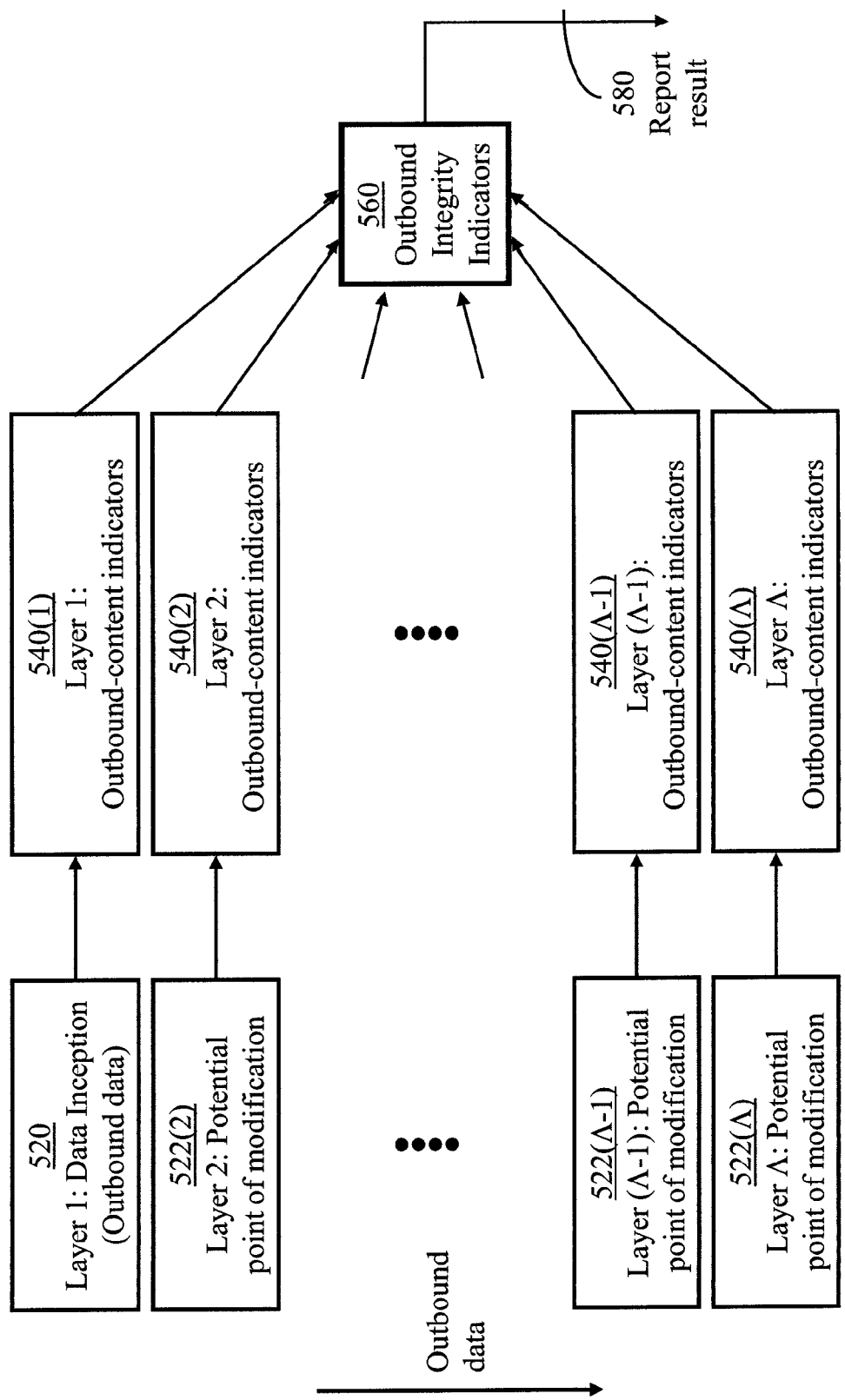
FIG. 5 illustrates a generic case where content indicators and integrity tests of outbound data are determined at multiple entities, in accordance with an embodiment of the present invention.

FIG. 5 illustrates a generic case where content indicators of outbound data are performed in a layered operating system organized into Λ layers at all potential entities 520, 522(2), ..., 522(Λ) as data traverses user and kernel mode spaces in the outbound direction. An entity is defined herein as a software component or a set of software components within a layer. The content indicators 540(1), 540(2), ..., 540(Λ) are then compared in a data integrity module to determine outbound integrity indicators 560 which determine whether data has been modified between any two points and a report 580 is produced. For example, consider a case where malware exists at a point between entity 2 and entity Λ and covertly modifies data. Comparison of content indicators between entity 2 and Λ would reveal that the data had been modified whereas the comparison of integrity checks between entity 1 and 2 would reveal no such changes.

Figure 6:
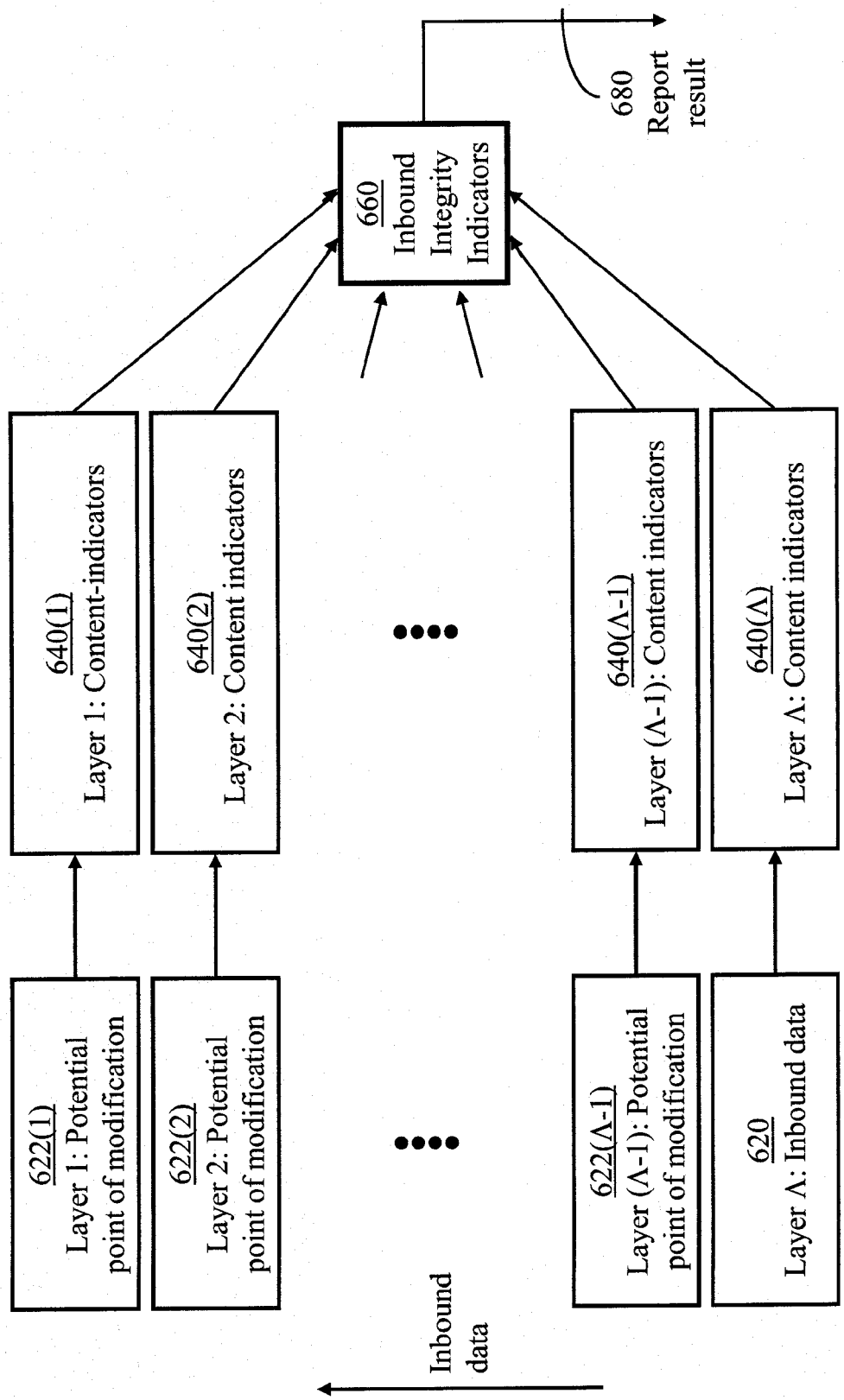
FIG. 6 illustrates a generic case where content indicators and integrity tests of inbound data are performed at multiple entities, in accordance with an embodiment of the present invention.

FIG. 6 illustrates a generic case where content indicators {640(Λ), 640(Λ−1), ..., 640(2), 640(1)}, of inbound data are performed at entities {620, 622(Λ−1), ..., 622(2), 622(1)} as data traverses kernel and user mode spaces in the inbound direction. The content indicators are then compared in a data integrity module to determine inbound integrity indicators 660 which indicates whether data has been modified between selected points and a report 680 is produced.

Figure 7:
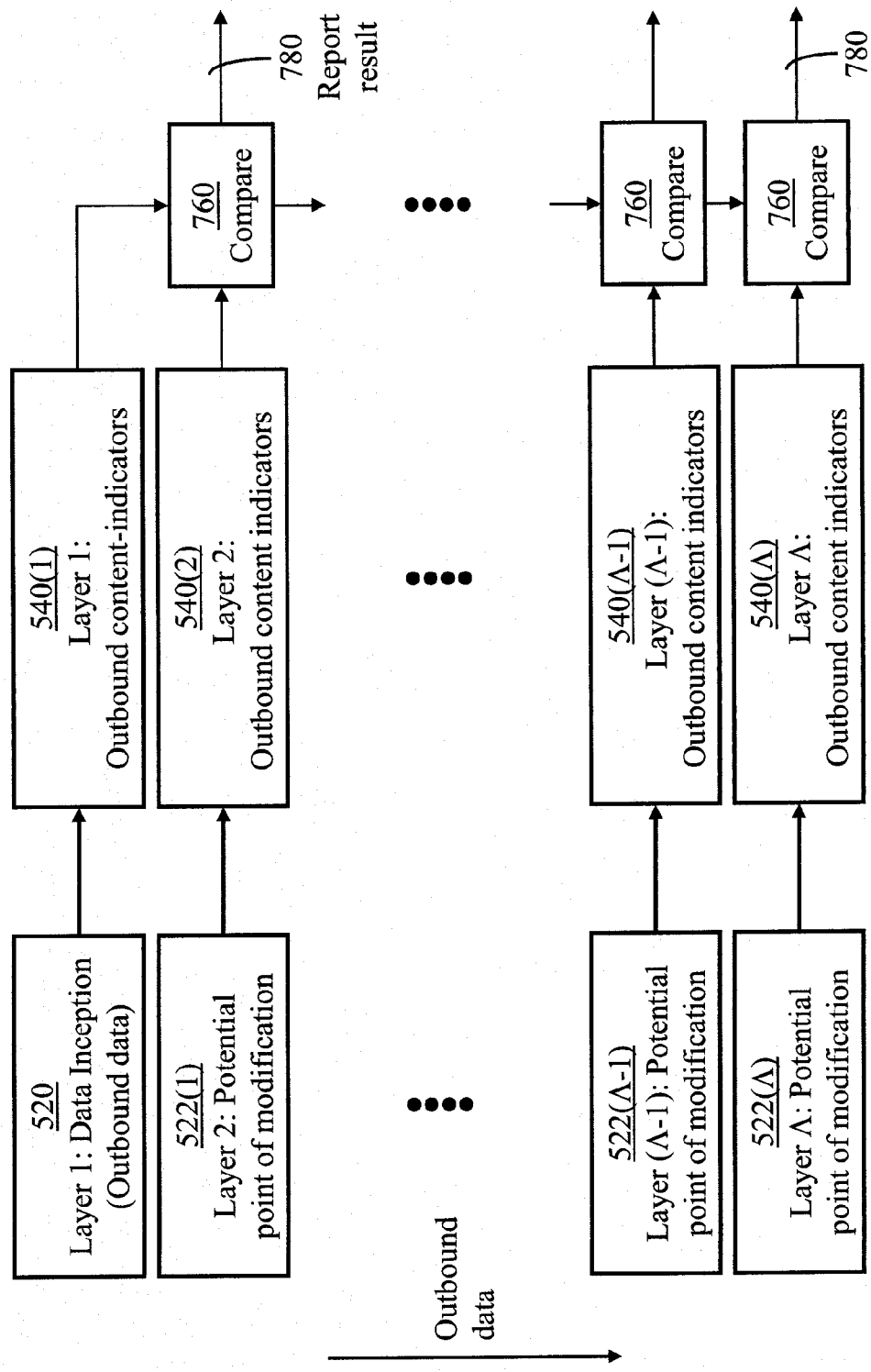
FIG. 7 illustrates pipelined integrity tests of outbound data performed across all entities, in accordance with an embodiment of the present invention.

FIG. 7 illustrates the generic case of FIG. 5 where outbound content indicators {540(1), 540(2), ..., 540(Λ)} are compared sequentially (process 760) in a data integrity module to identify all entities where data modification occurs and report results 780 of comparison at layers 522(2) to 522(Λ).

Figure 8:
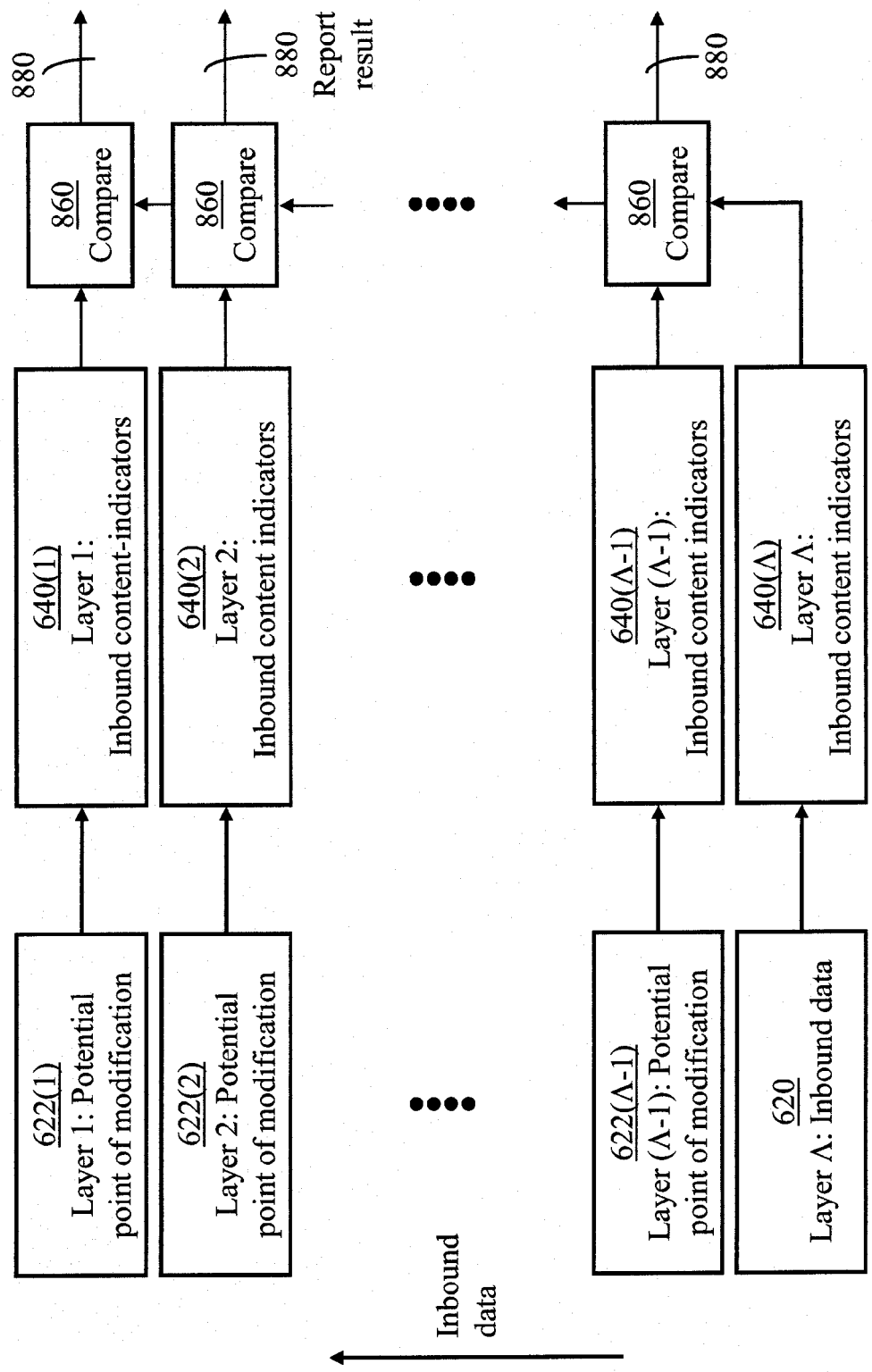
FIG. 8 illustrates pipelined integrity tests of inbound data performed across all entities, in accordance with an embodiment of the present invention.

FIG. 8 illustrates the generic case of FIG. 6 where inbound content indicators {640(Λ), 640(Λ−1), ..., 640(2), 640(1)} are compared sequentially (process 860) in a data integrity module to identify all entities where data modification occurs and report results 880 of comparison at layers (Λ−1) to 1.

Figure 9:
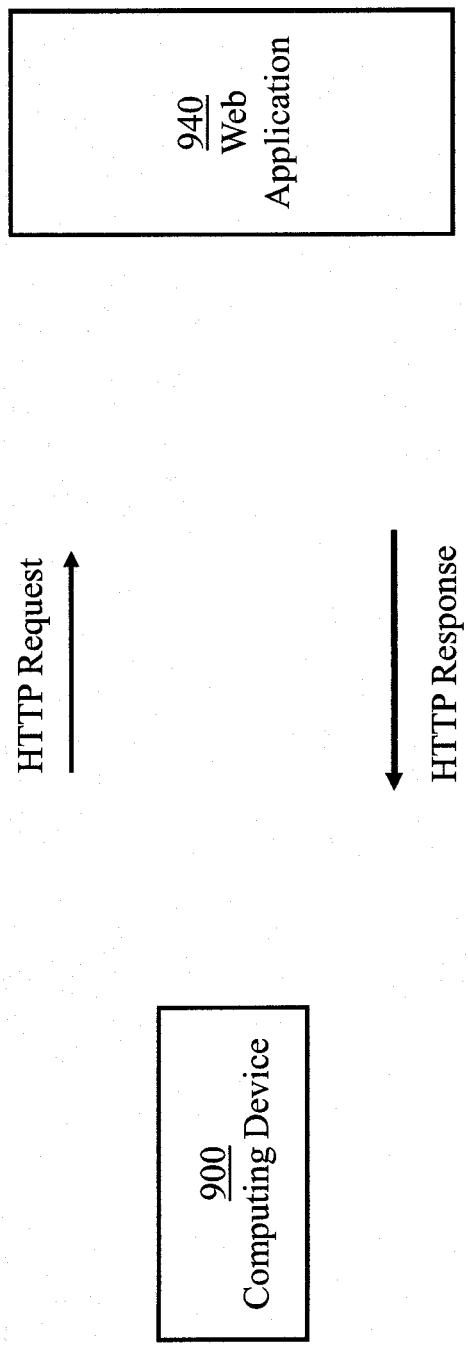
FIG. 9 illustrates a web browser on a computing device communicating with a web application over a network, for use in an embodiment of the present invention.

An embodiment of the invention is illustrated with a specific example case illustrated in FIG. 9 with data leaving a networked system from a web browser making an HTTP request to a web server somewhere on the network. A computing device 900 interacts with a web application 940 over a network using the HTTP protocol. The application data (HTTP request) may be modified in the outbound direction from the browser of the computing device 900 as it traverses the operating system user space and kernel space. The inbound data from the web application (HTTP response) may also be modified as it traverses the operating system kernel space and use space.

Figure 10:
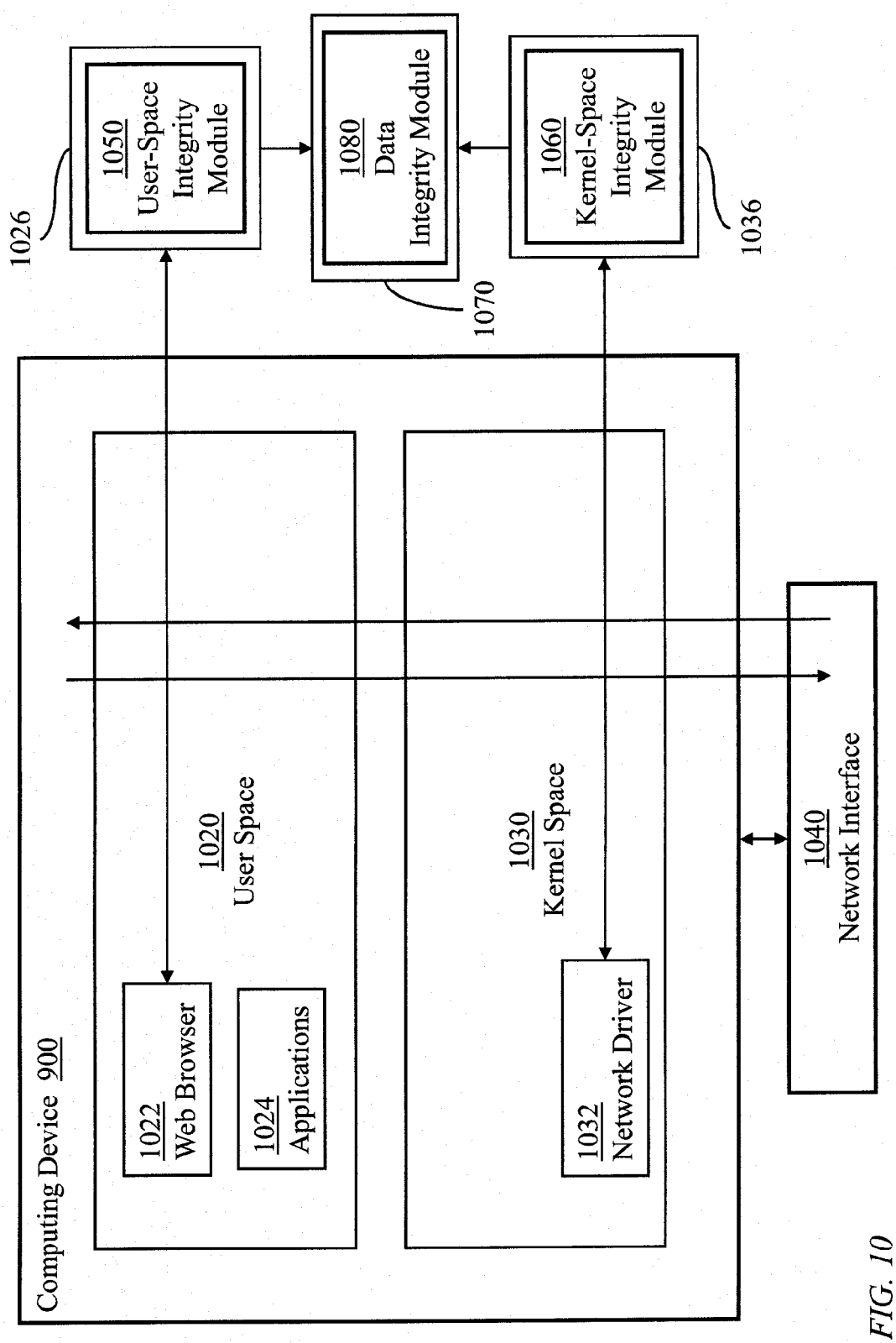
FIG. 10 illustrates components within a computing device used to perform the integrity tests, in accordance with an embodiment of the present application.

FIG. 10 illustrates data requests sent by the Web browser 1022 and return responses from the Web application back to the Web browser traversing multiple entities as they cross the operating system. The computing device 900 comprises a layered operating system with a kernel space 1030 and a user space 1020. The Web browser 1022 comprises software instructions running in user space with a user-space integrity module 1050 stored in a memory device 1026 used to copy information communicated to and from the Web browser 1022. The Network driver 1032 operates in kernel space 1030 and processes communications between the computing device 900 and the network through the network interface 1040. A kernel-space integrity module 1060 stored in a memory device 1036 comprises software instructions operating in kernel space 1030, which copies information communicated to and from the network driver 1032. A data integrity module 1080 stored in a memory device 1070 may be provided to determine whether changes have occurred using copies of the data from the user-space integrity module 1050 and the kernel-space integrity module 1060.

The computing device 900 includes a computer-readable storage medium holding program instructions to be executed by a processor of computing device 900 for performing the functions of the components illustrated FIG. 10. The storage medium may comprise electronic memory devices, CD-ROM, DVD, or any other suitable storage medium.

The data integrity module 1080 performs the following functions:
(a) matching respective information received from the user-integrity module 1050 and the kernel-space integrity module 1060;
(b) decrypting data received from the user-integrity module 1050, normalizing the data where needed, and computing respective content indicators;

(c) decrypting data received from the kernel-integrity module 1060, normalizing the data where needed, and computing respective content indicators;

(d) comparing corresponding content indicators determined in (b) and (c); and (e) reporting logs or alarms where data modifications are detected.

Figure 11:
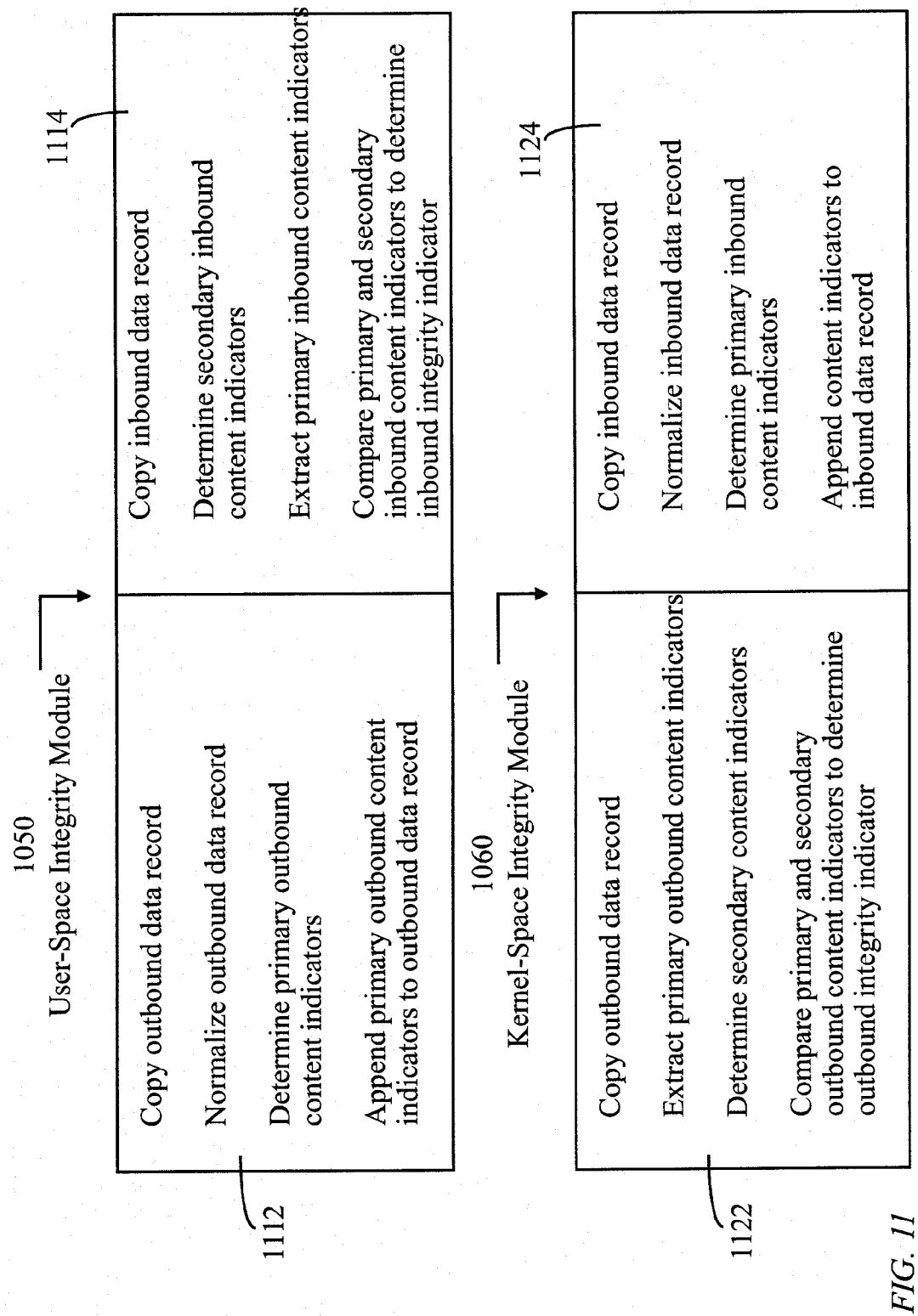
FIG. 11 illustrates a method of detecting data modification in a computing device based on determining data-content indicators, in accordance with an embodiment of the present invention.

FIG. 11 illustrates a method of detecting data modification in a computing device. The method is implemented in a user-space integrity module 1050 and a kernel-space integrity module 1060. The user-space integrity module 1050 comprises a first set of instructions 1112, stored in a first memory device, which are executed to cause a processor of the computing device to copy outbound data and determine primary outbound content indicators of the outbound data. The primary outbound content indicators may be communicated directly to the kernel-space integrity module 1060 or appended to the outbound data. The kernel-space integrity module 1060 comprises a second set of instructions 1122, stored in a second memory device, which are executed to cause the processor of the computing device to copy outbound data and determine secondary outbound content indicators of the outbound data. In order to determine integrity of the outbound data, the kernel-space integrity module 1060 compares the primary outbound content indicators with the secondary outbound content indicators. The kernel-space integrity module 1060 may receive the primary outbound content indicators directly from the primary user-space integrity module 1050. Alternatively, where the primary content indicators are appended to the outbound data, the kernel-space integrity module 1060 may extract the primary content indicators from the outbound data record received from the user-space integrity module 1050.

The kernel-space integrity module 1060 also comprises a ternary set of instructions 1124, stored in the second memory device, which are executed to cause the processor to copy an inbound data record received from a network, normalize the inbound data record, and determine primary inbound content indicators of the received inbound data record. The kernel-space integrity module 1060 may communicate the primary inbound content indicators directly to the user-space integrity module 1050 or append the primary inbound content indicators to the inbound data record.

The user-space integrity module 1050 also comprises a quartary set of instructions 1114, stored in the first memory device, which are executed to cause the processor to copy the inbound data record received from the kernel-space integrity module 1060 and extract the primary inbound content indicators if already appended to the inbound data record. The user-space integrity module 1050 may receive the primary inbound content indicators directly from the kernel-space integrity module 1060. The user-space integrity module 1050 determines secondary inbound content indicators and compares the primary inbound and secondary inbound content indicators to determine integrity of the inbound data record.

In summary, to detect presence of modification of outbound data within a computing device, a number N, N≥1, of primary outbound content indicators of outbound data at a user space are determined. N secondary outbound content indicators of the outbound data at the kernel space are determined and compared with respective primary outbound content indicators. The N primary outbound content indicators and N secondary outbound content indicators belong to a predefined set of M indicator types, M≥N. For example, the set of M indicator types, with M=4, may include a checksum indicator, a cryptographic hash indicator, a digital signature, and a fingerprint. With N set to equal 1, any of the four indicator types may be used. With N=2, any two indicator types may be used. Notably, using more than one content indicator types improves dependability of the integrity indicators. A primary outbound content indicator and a corresponding secondary outbound content indicator are of a common indicator type, such as a checksum indicator type, from among the set of M indicator types. Absence of modifications of the outbound data is ascertained if each of the N primary outbound content indicators is identical to a corresponding secondary outbound content indicator.

To detect presence of modification of inbound data within the computing device, N primary inbound content indicators of inbound data at a kernel space are determined, N secondary inbound content indicators of the inbound data at the user space are determined and compared with respective primary inbound content indicators. Absence of modifications of the inbound data is ascertained if each of the N primary inbound content indicators is identical to a corresponding secondary inbound content indicator.

Figure 12:
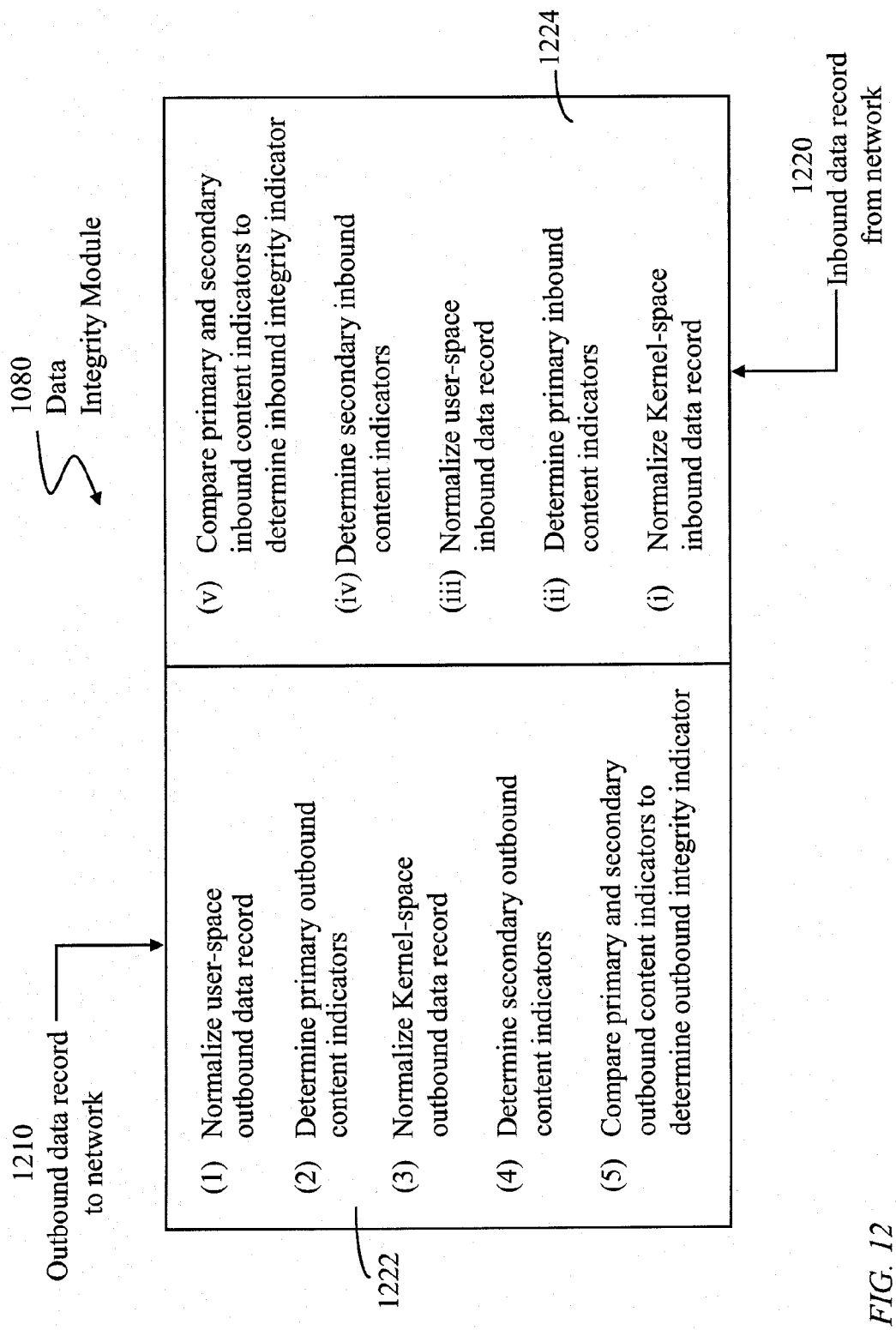
FIG. 12 illustrates an alternate method of detecting data modification in a computing device based on determining data-content indicators, in accordance with an embodiment of the present invention.

FIG. 12 illustrates a variation of the method of FIG. 11. The method is implemented in a data integrity module 1080 which comprises a primary set of instructions 1222 for processing outbound data records 1210 and a secondary set of instructions 1224 for processing inbound data records 1220. The two sets of instructions 1222 and 1224 have different input data but may have common software instructions which may be executed to process either outbound data records or inbound data records. The data integrity module 1080 is stored in a memory device of a computing device.

The primary set of instructions 1222 are executed to cause a processor of the computing device to determine primary content indicators of an outbound data record 1210 received from the user space, normalize the outbound record received at the kernel space, and determine secondary content indicators of the outbound record. The primary and secondary outbound content indicators are compared to determine whether the outbound data record has been modified.

The secondary instructions 1224 are executed to cause the processor to receive inbound data record 1220 from a network, normalize the received inbound data record, determine primary inbound content indicators, and determine secondary inbound content indicators of the inbound data record received at the user space. The primary and secondary inbound content indicators are compared to determine whether the inbound data record has been modified.

Figure 13:
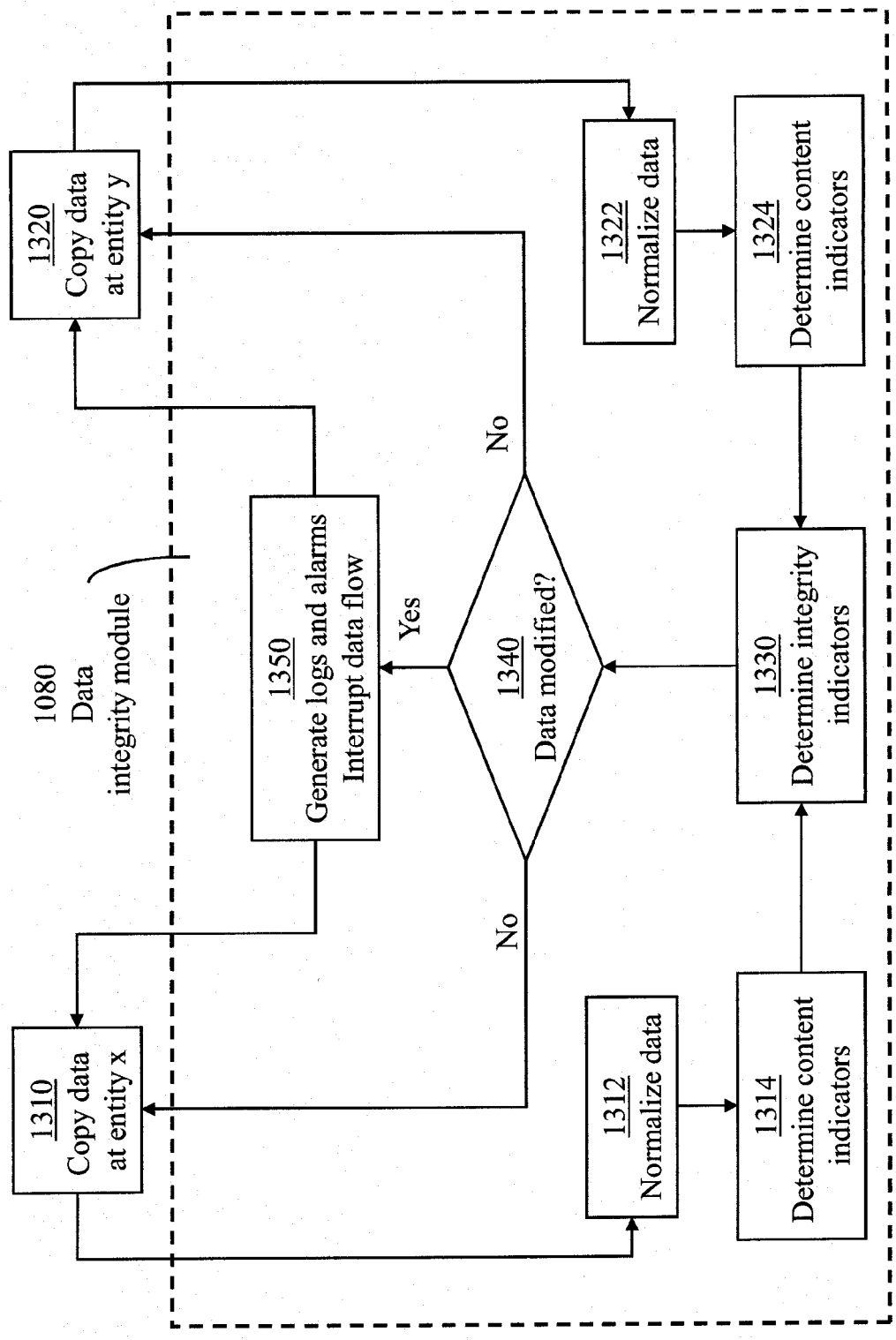
FIG. 13 illustrates a system for detecting data modification, in accordance with an embodiment of the present invention.

FIG. 13 further illustrates a system for detecting data modification within an operating system for an exemplary case where specific communicated information is captured at two separate entities 522-x and 522-Y in the layered operating system illustrated in FIG. 5 and FIG. 6 and verified to determine whether the information has been modified as it crossed the operating system. The system is based on a specific configuration of data integrity module 1080 of FIG. 10. A supervision module 1350 is included in data integrity module 1080. Entity 522-x is in user-mode space and entity 522-Y is in kernel-mode space. For proper data integrity testing and comparison, different normalization operations would occur depending on the entity providing the data. Basically the normalization operations would perform similar data processing transformations that would be expected to have occurred on the real data as it crossed the entities between the two comparison points.

In the outbound direction, outbound data 1310 from entity "x" (522-x) of user-space integrity module 1050 is processed in step 1314 to determine primary outbound content indicators. Data received from kernel-space integrity module 1060 is normalized in step 1322 and processed in step 1324 to determine secondary outbound content indicators at entity "y" (522-y). An integrity test is performed in step 1330 where the primary outbound content indicators and the secondary outbound content indicators are correlated. Step 1340 then determines whether data modification occurred in either entity 522-x, entity 522-y, or within an intermediate entity, if any. If step 1340 determines that data modification occurred, supervision module 1350 is activated to generate logs and alarms relevant to the outbound data. Additionally, supervision module 1350 may interrupt the flow of modified data so that the outbound data would not be sent to the network. If step 1340 ascertains data integrity, the process is repeated where steps 1310 and 1320 are activated to receive new outbound data traversing entity 522-x and entity 522-y. Notably, the indices x and y of entities 522-x and 522-y may change in successive processes, i.e., successive processes may apply to different pairs of entities.

In the inbound direction, inbound data 1320 from entity "y" of kernel-space integrity module 1060 is normalized in step 1322 and processed in step 1324 to determine primary inbound content indicators. Data received from user-space integrity module 1050 is processed in step 1314 to determine secondary inbound content indicators at entity "x". An integrity test is performed in step 1330 where the primary inbound content indicators and the secondary inbound content indicators are correlated. Step 1340 performs similar functions for inbound data and output data. If step 1340 determines that data modification occurred, supervision module 1350 is activated to generate logs and alarms relevant to the inbound data. Supervision module 1350 may interrupt the flow of modified data so that the inbound data would not be further processed.

In a further embodiment, the instructions would cause a processor to prevent modified data to leave a system or arrive at the user mode application.

Alternate content indicators such as checksum, cryptographic hash, or signature may be used. A combination of two or more content indicators may also be used. In another embodiment, direct data comparison may be performed. Direct data comparison enables identifying and locating changes made to the data, if any.

In another embodiment, the kernel-space integrity module 1060 and the user-space integrity module 1050 compute the content indicators before passing them along to the data integrity module 1080.

Figure 14:
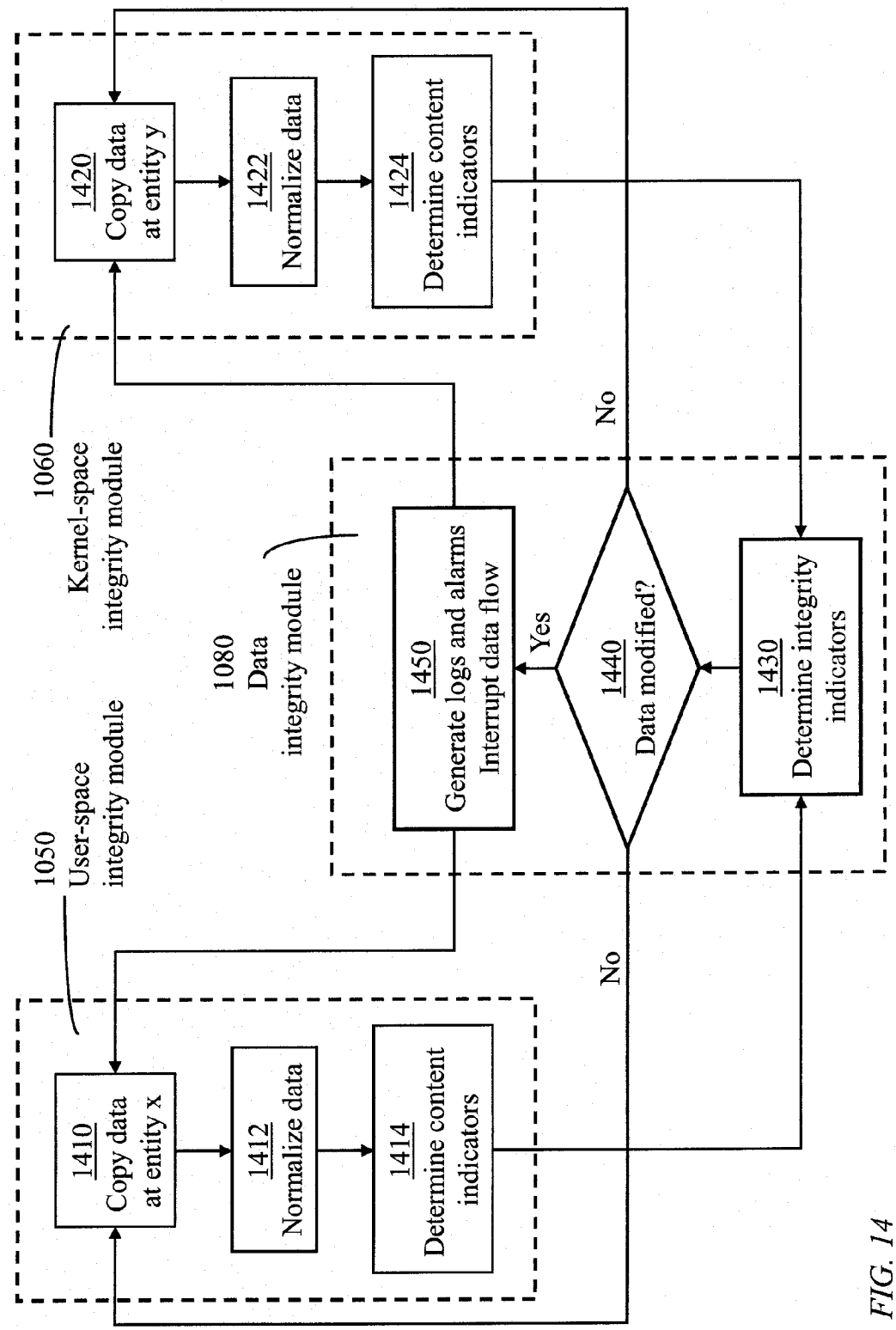
FIG. 14 illustrates an alternate system for detecting data modification, in accordance with an embodiment of the present invention.

FIG. 14 illustrates another system for detecting data modification within an operating system. The figure illustrates an example where specific communicated information is captured at two separate entities 522-x and 522-Y in the layered operating system illustrated in FIG. 5 and verified to determine whether the information has been modified as it crossed the operating system. The system is based on a specific configuration of data integrity module 1080 of FIG. 10 which includes a supervision module 1450. In the illustrated exemplary case, entity 522-x is in user-mode space and entity 522-Y is in kernel-mode space.

In the outbound direction, outbound data 1410 from entity "x" (522-x) of user-space integrity module 1050 is processed in step 1414 to determine primary outbound content indicators. Data received from kernel-space integrity module 1060 is normalized in step 1422 and processed in step 1424 to determine secondary outbound content indicators at entity "y" (522-y). In step 1430, an integrity test is performed in the data integrity module 1080 where the primary outbound content indicators and the secondary outbound content indicators are correlated. Step 1440 determines whether data modification occurred in either entity 522-x, entity 522-y, or within an intermediate entity, if any. If step 1440 determines that data modification occurred, step 1450 is activated to generate logs and alarms relevant to the outbound data. Additionally, step 1450 may interrupt the flow of modified data so that the outbound data would not be sent to the network. If step 1440 ascertains data integrity, the process is repeated where steps 1410 and 1420 are activated to receive new outbound data traversing entity 522-x and entity 522-y.

In the inbound direction, inbound data 1420 from entity "y" of kernel-space integrity module 1060 is normalized in step 1422 and processed in step 1424 to determine primary inbound content indicators. Data received from user-space integrity module 1050 is processed in step 1414 to determine secondary inbound content indicators at entity "x". A normalization process may take place in step 1412. An integrity test is performed in step 1430 where the primary inbound content indicators and the secondary inbound content indicators are correlated. Step 1440 performs similar functions for inbound data and output data. If step 1440 determines that data modification occurred, step 1450 is activated to generate logs and alarms relevant to the inbound data Step 1450 may interrupt the flow of modified data so that the inbound data would not be further processed.

In a further embodiment, the data integrity module 1080 of the arrangement of FIG. 13 or the arrangement of FIG. 14 may be implemented as an external module stored in a computer-readable storage medium. The external module may comprise program instructions to be executed by a computer processor. The external module may be adapted to provide data-integrity verification to computers of different configurations.

In a further embodiment, the outbound content indicators and inbound content indicators are inserted into the data and the detection of data modification is performed across two computers communicating over a network.

Figure 15:
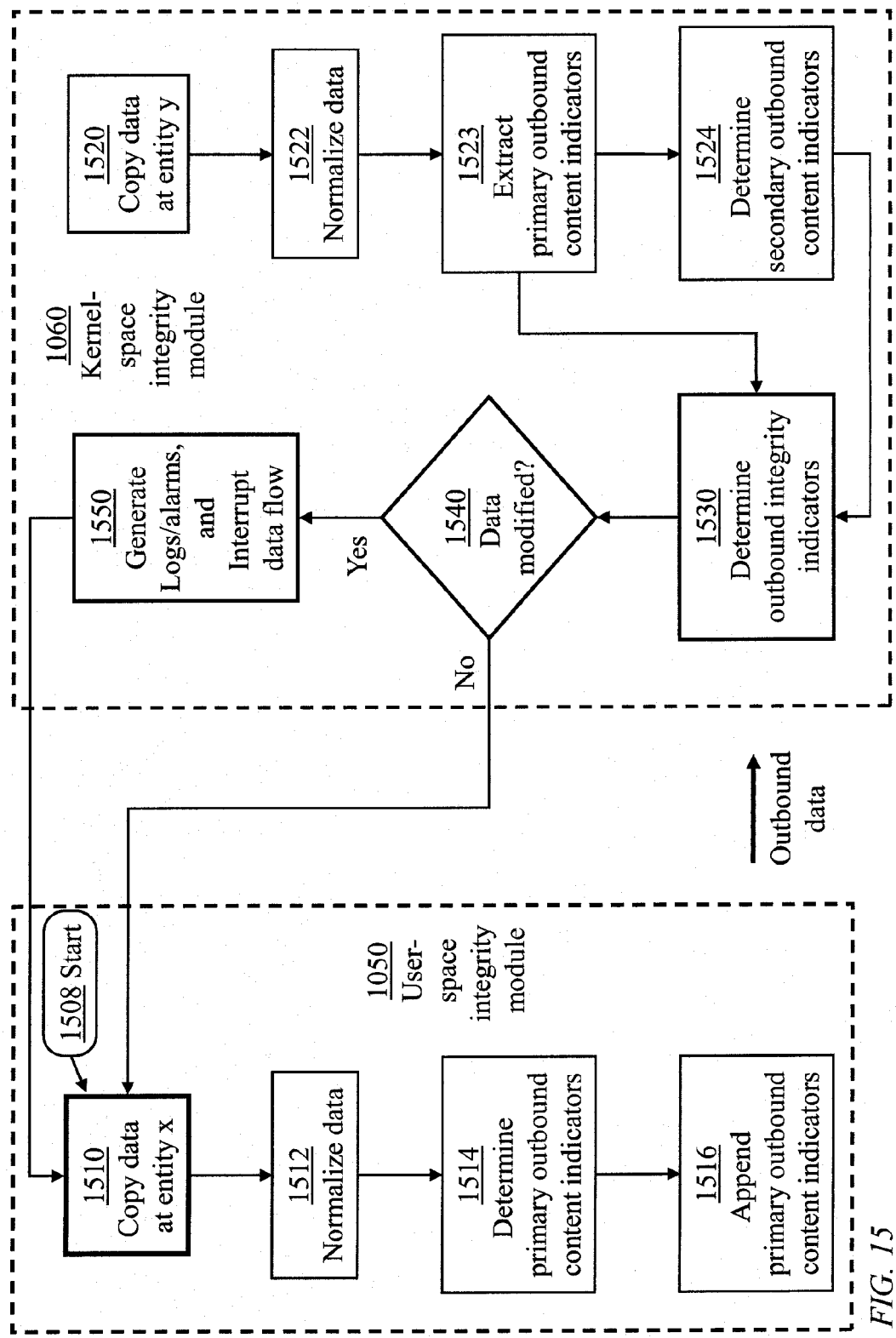
FIG. 15 and FIG. 16 illustrate a system for detecting data modification, in accordance with an embodiment of the present invention.
Figure 16:
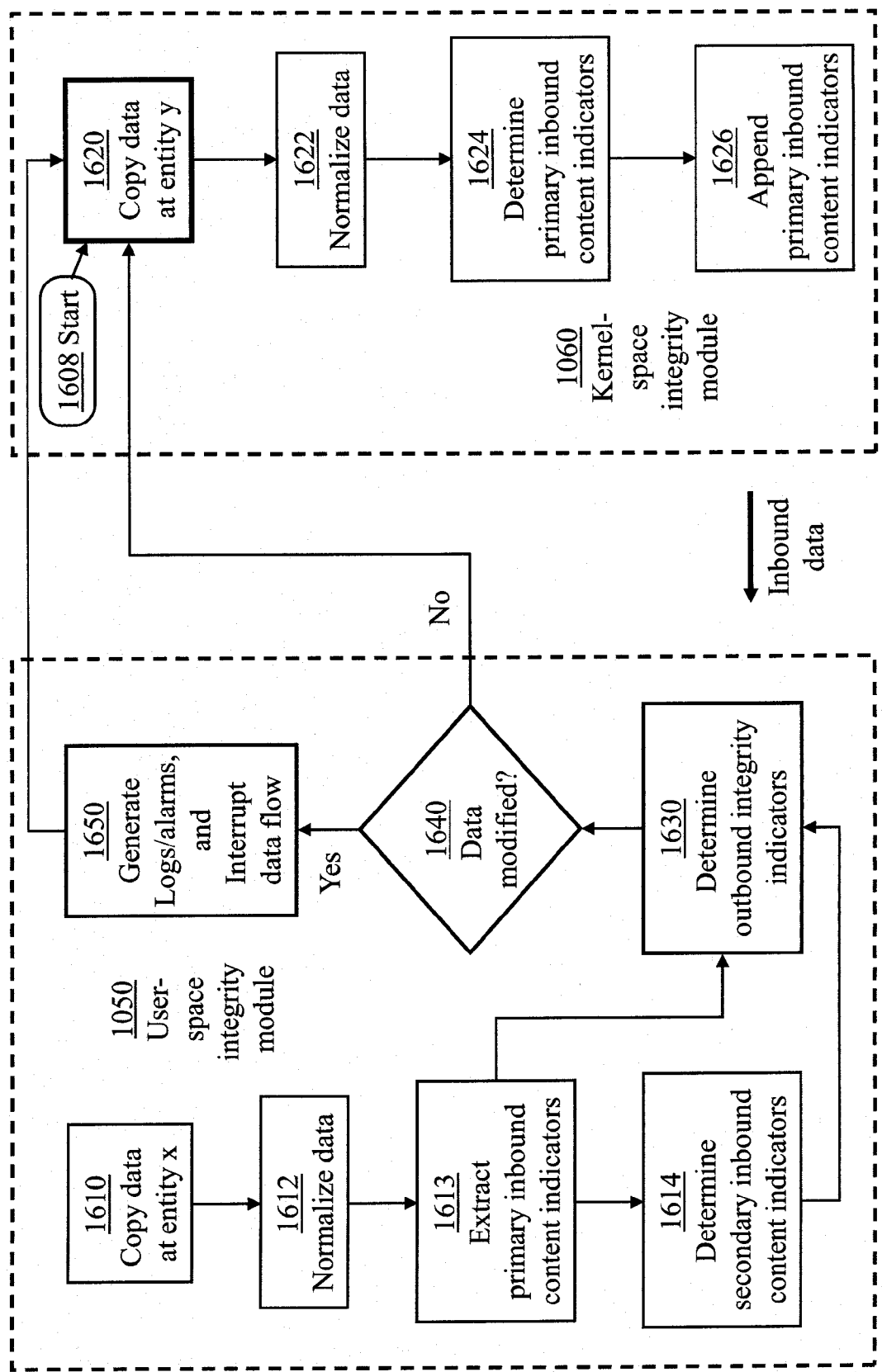

FIG. 15 and FIG. 16 illustrate a system for detecting data modification within an operating system where the user-space integrity module 1050 (FIG. 10) and the kernel-space integrity module 1060 (FIG. 10) communicate directly through appended content indicators in both the outbound direction and inbound direction thus eliminating the need for the data integrity module 1080 (FIG. 10). User-space integrity module 1050 includes a supervision module 1650 (FIG. 16) and kernel-space integrity module 1060 includes a supervision module 1550 (FIG. 15). As in the systems of FIG. 13 and FIG. 14, specific communicated information is captured at two separate entities 522-x and 522-y in the layered operating system illustrated in FIG. 5 and FIG. 6. Entity 522-x is in user-mode space and entity 522-Y is in kernel-mode space.

Step 1508 initiates a process of outbound data examination. Outbound data 1510 from entity 522-x of user-space integrity module 1050 is processed in step 1514 to determine primary outbound content indicators. The primary outbound content indicators are appended to the outbound data in step 1516. Data normalization may be performed in step 1512.

Data received from kernel-space integrity module 1060 is copied in step 1520 and normalized in step 1522. Referring to FIG. 15, step 1523 extracts primary outbound content indicators from the received data and step 1524 processes the received data to determine secondary outbound content indicators at entity 522-y. An integrity test is performed in step 1530 where the primary outbound content indicators and the secondary outbound content indicators are correlated. Step 1540 determines whether data modification occurred in either entity 522-x, entity 522-y, or within an intermediate entity between entities 522-x and 522-y, if any. If step 1540 determines that data modification occurred, supervision module 1550 is activated to generate logs and alarms relevant to the outbound data. Additionally, supervision module 1550 may interrupt the flow of modified data so that the outbound data would not be sent to the network. If step 1540 ascertains data integrity, the process is repeated where step 1510 is activated to receive new outbound data traversing entity 522-*x*.

Referring to FIG. 16, step 1608 initiates a process of inbound data examination. Inbound data 1620 from entity "y" of kernel-space integrity module 1060 is normalized in step 1622. Step 1624 determines primary inbound content indicators and step 1626 appends the primary inbound content indicators to the received inbound data. Inbound received at user-space integrity module 1050 is copied in step 1610. Data may be normalized in step 1612. Step 1613 extracts primary inbound content indicators. The received inbound data is processed in step 1614 to determine secondary inbound content indicators at entity 522-*x*. An integrity test is performed in step 1630 where the primary inbound content indicators and the secondary inbound content indicators are correlated. If step 1640 determines that data modification occurred, step supervision module 1650 is activated to generate logs and alarms relevant to the inbound data. Supervision module 1650 may interrupt the flow of modified data so that modified inbound data would not be further processed.

Figure 17:
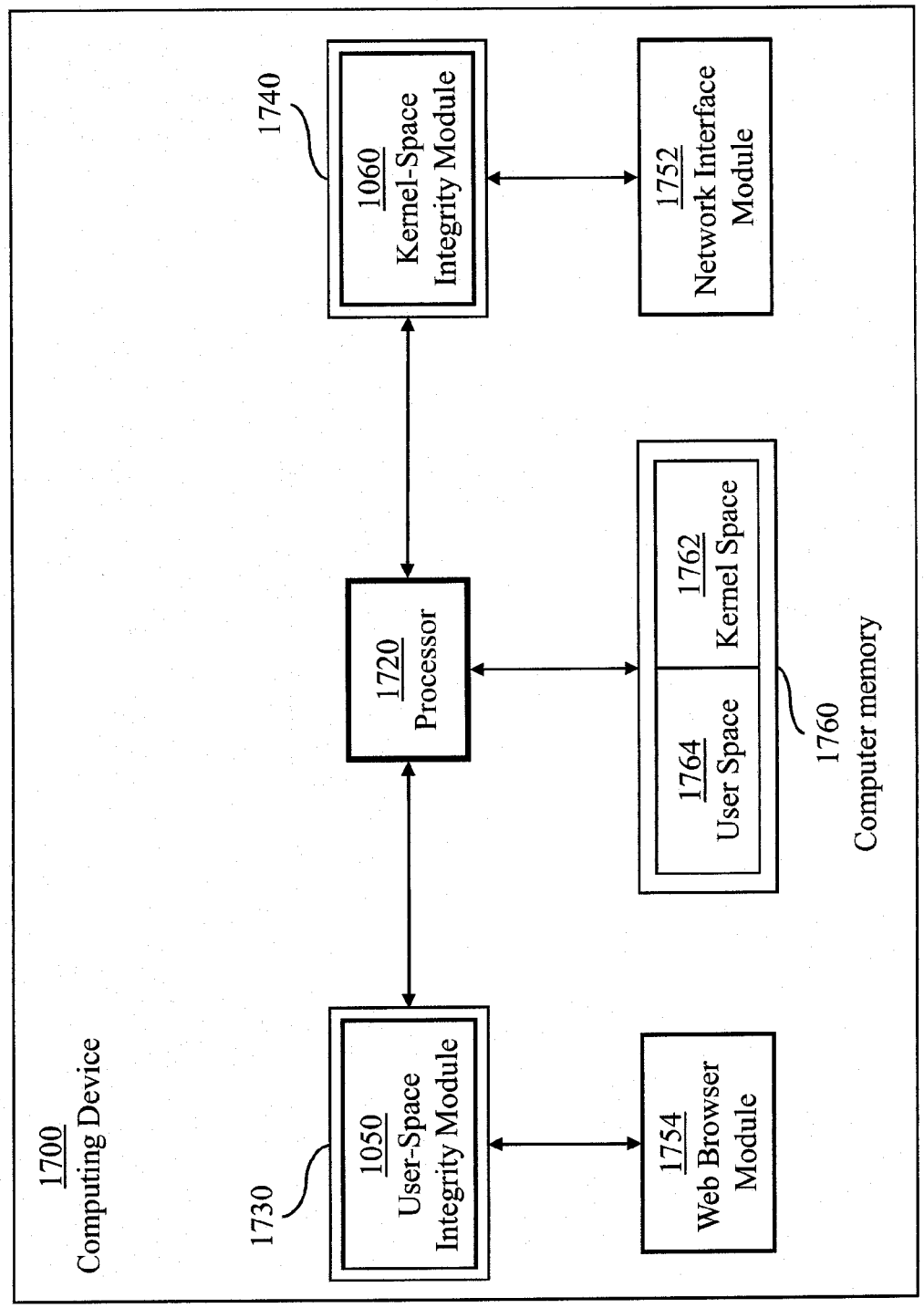
FIG. 17 illustrates a computing device configured to support integrity modules for detecting data modifications, in accordance with an embodiment of the present invention.

FIG. 17 illustrates a computing device 1700 configured for detecting data modification across the operating system's kernel and user mode spaces and preventing continued progress of modified data. The computing device 1700 comprises a processor 1720 and a shared memory 1760 segmented into a user-space memory 1764 and a kernel-space memory 1762. The user-space memory 1764 stores user mode applications and a web browser module comprising instructions which cause the processor 1720 to retrieve information from a network and send information to a network. The kernel-space memory 1762 stores a kernel of an operating system of the computing device and a network-interface module comprising instructions which cause the processor 1720 to retrieve information from a network and send information to a network.

The computing device 1700 further comprises a first memory device 1730 and a second memory device 1740. The memory device 1730 stores a user-space integrity module 1050 (FIG. 10) which includes a first set of instructions which cause the processor to determine a first content indicator of the outbound data and append the first content indicator to the outbound data to produce appended outbound data.

The second memory device 1740 stores a kernel-space integrity module 1060 (FIG. 10) which includes a second set of instructions which cause the processor to extract the first content indicator, determine a second content indicator of the outbound data, and compare the second content indicator with the extracted first content indicator to determine an integrity indicator of the outbound data.

The second memory device 1740 also stores a third set of instructions which cause the processor to determine a primary inbound content indicator of the inbound data and append the primary inbound content indicator to the inbound data to produce appended inbound data. The first memory device 1730 also stores a fourth set of instructions which cause the processor to determine a secondary inbound content indicator of the inbound data received from the web browser and compare the secondary inbound content indicator with the primary inbound content indicator of the appended inbound data to determine an integrity indicator of the inbound data.

The instructions contained in the software modules described above may be stored in respective computer readable storage media. When executed, the instructions cause the processor 1720 to perform corresponding method steps as described with regard to FIG. 11 to FIG. 16.

Figure 18:
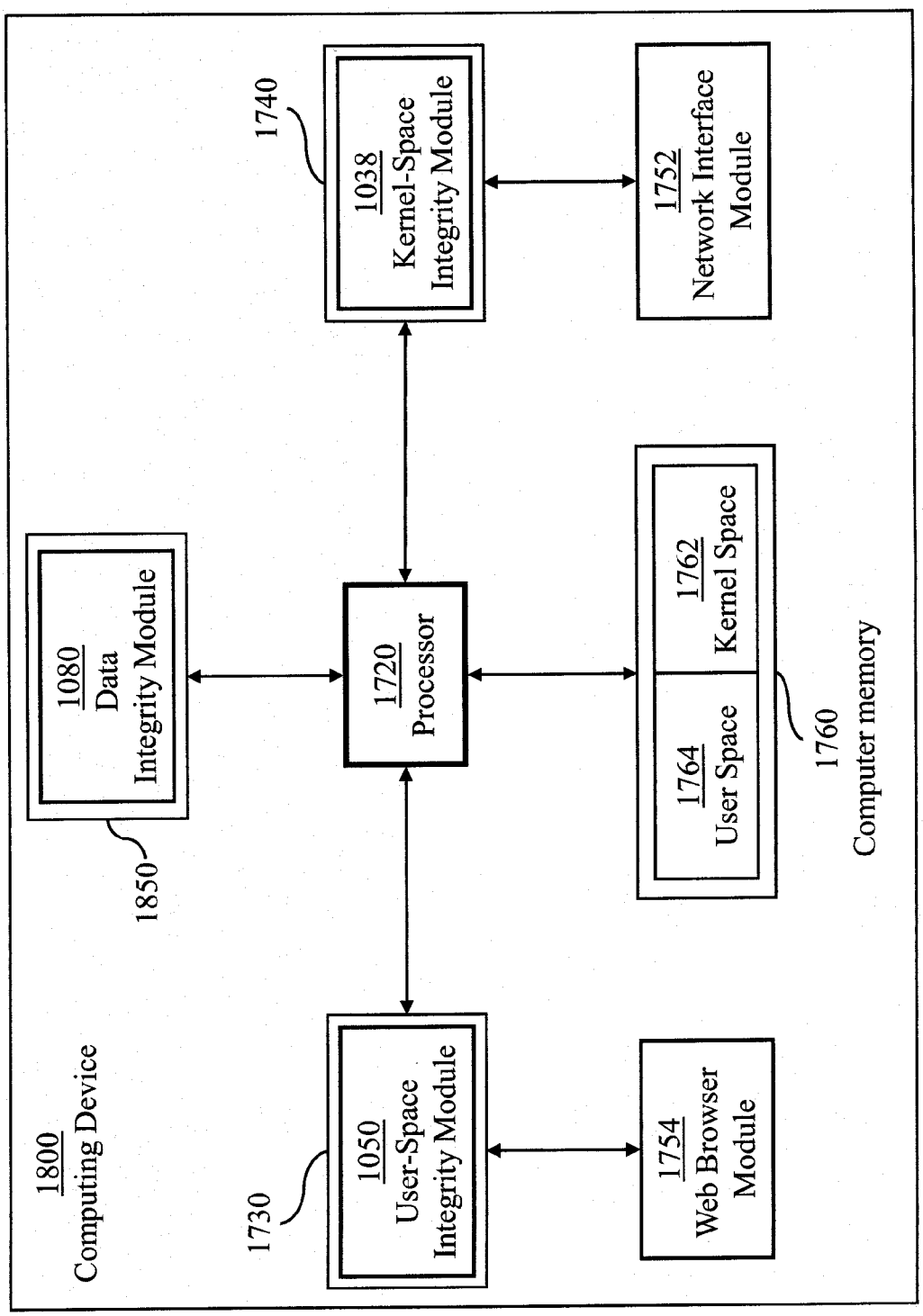
FIG. 18 illustrates a variation of the configuration of FIG. 17, in accordance with an embodiment of the present invention.

FIG. 18 illustrates a computing device 1800 configured for detecting data modification across the operating system's kernel and user mode spaces and preventing continued progress of modified data. The computing device 1800 comprises a processor 1720 and a shared memory 1740 similar to that of the configuration of FIG. 17.

The computing device 1800 comprises a first memory device 1730, a second memory device 1740 and a memory device 1850. The memory device 1730 stores a user-space integrity module 1050 (FIG. 10) which includes a first set of instructions which cause the processor 1720 to determine a first content indicator of the outbound data. The memory device 1740 stores a kernel-space integrity module 1060 (FIG. 10) which includes a second set of instructions which cause the processor 1720 determine a second content indicator of the outbound data. The second memory device 1740 also stores a third set of instructions which cause the processor to determine a primary inbound content indicator of the inbound data. The first memory device 1730 also stores a fourth set of instructions which cause the processor to determine a secondary inbound content indicator of the inbound data received from the web browser.

The memory device 1850 stores instructions 1080 (FIG. 10) which cause the processor to compare the second outbound content indicator with the first outbound content indicator to determine an integrity indicator of the outbound data, and compare the secondary inbound content indicator with the primary inbound content indicator to determine an integrity indicator of the inbound data.

In summary, embodiments of the present invention enable: (1) detection of data modifications across the operating system's kernel and user mode spaces; (2) prevention of modified outbound data from reaching a network; (3) prevention of modified input data from reaching a user application; and (4) detection of malware or faults within an operating system.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method of examining data within a computing device to detect data modification, said computing device having at least one processor and memory segregated into kernel space and user space, the method comprising configuring said at least one processor to perform:

determining a number N, N>1, of primary outbound content indicators of outbound data at said user space, said N primary outbound content indicators belonging to a set of M different indicator types, M≥N;

determining N secondary outbound content indicators of said outbound data at said kernel space, said N secondary outbound content indicators belonging to said set of M different indicator types; and comparing each said primary outbound content indicator with a corresponding secondary outbound content indicator, wherein a primary outbound content indicator and a corresponding secondary outbound content indicator have a common indicator type from among said set of M different indicator types; and ascertaining absence of modifications of said outbound data according to a result of said comparing.

2. The method of claim 1, further comprising:
   determining N primary inbound content indicators of inbound data received at said kernel space, said N primary inbound content indicators belonging to said set of M different indicator types;
   determining N secondary inbound content indicators of said inbound data at said user space, said N secondary inbound content indicators belonging to said set of M different indicator types;
   correlating each said primary inbound content indicator with a corresponding secondary inbound content indicator, wherein a primary inbound content indicator and a corresponding secondary inbound content indicator have a common indicator type from among said set of M different indicator types; and
   ascertaining absence of modifications of said inbound data according to a result of said comparing.

3. The method of claim 2, further comprising communicating said primary outbound content indicators, said secondary outbound content indicators, said primary inbound content indicators, and said secondary inbound content indicators to a verification module installed on a memory device coupled to said at least one processor for performing said steps of comparing each said primary outbound content indicator with a corresponding secondary outbound content indicator and correlating each said primary inbound content indicator with a corresponding secondary inbound content indicator.

4. The method of claim 2, further comprising:
   appending said primary outbound content indicators to said outbound data to facilitate said step of comparing each said primary outbound content indicator with a corresponding secondary outbound content indicator; and
   appending said primary inbound content indicators to said inbound data to facilitate said step of correlating each said primary inbound content indicator with a corresponding secondary inbound content indicator.

5. The method of claim 2, further comprising:
   producing logs and alarms upon detecting modification of either of said outbound data or said inbound data;
   preventing said outbound data from leaving said computing device upon detecting modifications of said outbound data; and
   discarding said inbound data upon detecting modifications of said inbound data.

6. The method of claim 1, further comprising selecting said set of M different indicator types to comprise:
   a checksum indicator;
   a cryptographic hash indicator;
   a digital signature; and
   a fingerprint.

7. The method of claim 6, further comprising:
   normalizing said outbound data before determining said secondary outbound content indicators; and
   normalizing said inbound data before determining said primary inbound content indicators.

8. A system for detecting data modification in a computing device having a processor, a kernel-space memory storing a network driver and a user-space memory storing a web browser module, the system comprising:
   a first memory device, associated with said user-space memory, having stored thereon a first set of instructions which cause said processor to:
      determine multiple primary outbound content indicators of an outbound data record leaving said web browser; and
      append said multiple primary outbound content indicators to said outbound data record;
   a second memory device, associated with said kernel-space memory, having stored thereon a second set of instructions which cause said processor to:
      extract said multiple primary outbound content indicators from said outbound data record;
      determine multiple secondary outbound content indicators of said outbound data record as it reaches said network driver; and
      compare at least two of said multiple secondary outbound content indicators with corresponding primary outbound content indicators of said multiple primary outbound content indicators to determine integrity indicators of said outbound data record.

9. The system of claim 8, further comprising:
   a third set of instructions stored in said second memory device which cause said processor to:
      determine multiple primary inbound content indicators of an inbound data record received at said network driver;
      append said multiple primary inbound content indicators to said inbound data record;
   and
   a fourth set of instructions stored in said first memory device which cause said processor to:
      extract said multiple primary inbound content indicators from said inbound data record;
      determine multiple secondary inbound content indicators of said inbound data record as it reaches said web browser; and
      compare at least two of said multiple secondary inbound content indicators with corresponding primary inbound content indicators of said multiple primary inbound content indicators to determine integrity indicators of said inbound data record.

10. The system of claim 9, further comprising additional instructions stored in said first memory device which cause said processor to discard said inbound data record subject to a determination of an unfavorable integrity indicator of said inbound data record.

11. The system of claim 10, wherein said primary outbound content indicators, said secondary outbound content indicators, said primary inbound content indicators, and said secondary inbound content indicators comprise:
   a checksum indicator;
   a cryptographic hash indicator;
   a digital signature; and
   a fingerprint.

12. The system of claim 9, further comprising a supervision module for performing at least one of the following functions:
   upon determining an unfavorable integrity indicator of said outbound data record:
      generating logs and alarms relevant to said outbound data record; and
      preventing transmission of said outbound data record to said network;
   and
   upon determining an unfavorable integrity indicator of said inbound data record:
      generating logs and alarms relevant to said inbound data record; and
      discarding said inbound data record.

13. The system of claim 8, further comprising additional instructions stored in said second memory device which cause said processor to prevent said outbound data record from leaving said computing device subject to a determination of an unfavorable integrity indicator of said outbound data record.

14. A computing device, comprising:
   a processor;
   a shared memory segmented into:
      a user memory having stored thereon user-mode applications and a web browser module comprising instructions which cause said processor to retrieve information from a network and send information to a network;
      a kernel memory having stored thereon a kernel of an operating system of said computing device and a network-interface module comprising instructions which cause said processor to retrieve information from a network and send information to a network;
   a first memory device having stored thereon a first set of instructions which cause said processor to:
      determine a first set of content indicators of said outbound data; and
      append said first set of content indicators to said outbound data to produce appended outbound data;
   a second memory device having stored thereon a second set of instructions which cause said processor to:
      determine a second set of content indicators of said outbound data; and
      compare at least two content indicators of said second set of content indicators with corresponding content indicators of said first set of content indicators of said appended outbound data to determine an integrity indicator of said outbound data.

15. The computing device of claim 14, further comprising:
   a third set of instructions, stored in said second memory device, which cause said processor to:
      determine a third content indicator of said inbound data; and
      append said third content indicator to said inbound data to produce appended inbound data;
   a fourth set of instructions, stored in said first memory device, which cause said processor to:
      determine a fourth content indicator of said inbound data received from said web browser; and
      compare said fourth content indicator with said third content indicator of said appended inbound data to determine an integrity indicator of said inbound data.

16. The computing device of claim 15, further comprising additional instructions, stored in said first memory device, which cause said processor to admit said inbound data record based on a specific state of said integrity indicator of said inbound data record.

17. The computing device of claim 15, further comprising a sixth set of instructions stored in said first memory device which, upon determining an unfavorable integrity indicator of said inbound data record, causes said processor to:
   generate logs and alarms relevant to said inbound data record; and
   discard said inbound data record.

18. The computing device of claim 14, further comprising additional instructions, stored in said second memory device, which cause said processor to permit said outbound data to leave said computing device based on a specific state of said integrity indicator of said outbound data.

19. The computing device of claim 14, further comprising a fifth set of instructions stored in said second memory device which, upon determining an unfavorable integrity indicator of said outbound data record, causes said processor to:
   generate logs and alarms relevant to said outbound data record; and
   prevent transmission of said outbound data record to said network.

20. The computing device of claim 14, wherein said first memory device and said second memory device are embedded in said shared memory.

* * * * *

UNITED STATES PATENT AND TRADEMARK OFFICE
CERTIFICATE OF CORRECTION

PATENT NO.         : 8,713,312 B2
APPLICATION NO.    : 12/631859
DATED              : April 29, 2014
INVENTOR(S)        : Rares Stefan et al.

It is certified that error appears in the above-identified patent and that said Letters Patent is hereby corrected as shown below:

On the Title page, Item "(73) Assignee: Trend Micrio Incorporated, Tokyo (JP)" should read
--(73) Assignee: Trend Micro Incorporated, Tokyo (JP)--.

Signed and Sealed this
Eighteenth Day of November, 2014

Michelle K. Lee
*Deputy Director of the United States Patent and Trademark Office*